(12) United States Patent
Ogawa

(10) Patent No.: US 11,564,197 B2
(45) Date of Patent: Jan. 24, 2023

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Nobuhiro Ogawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 17/112,712

(22) Filed: Dec. 4, 2020

(65) Prior Publication Data

US 2021/0185633 A1 Jun. 17, 2021

(30) Foreign Application Priority Data

Dec. 11, 2019 (JP) .............................. JP2019-224026

(51) Int. Cl.
*H04W 64/00* (2009.01)
*H04W 4/80* (2018.01)
*H01Q 21/28* (2006.01)

(52) U.S. Cl.
CPC .......... *H04W 64/003* (2013.01); *H01Q 21/28* (2013.01); *H04W 4/80* (2018.02)

(58) Field of Classification Search
CPC ..... H04W 64/003; H04W 4/80; H04W 4/023; H01Q 21/28
See application file for complete search history.

(56) References Cited

U.S. PATENT DOCUMENTS 6,822,754 B1 * 11/2004 Shiohara ............... G06F 3/1226
 709/200
8,786,875 B1 * 7/2014 Khafizova ............... H04L 67/06
 358/1.15

FOREIGN PATENT DOCUMENTS

JP 2016-110208 A 6/2016

* cited by examiner

*Primary Examiner* — Kabir A Timory
(74) *Attorney, Agent, or Firm* — Canon U.S.A., Inc. I.P. Division

(57) ABSTRACT

An information processing apparatus includes a specifying unit, an obtaining unit, and a display unit. The specifying unit specifies a first position of a communication apparatus viewed from the information processing apparatus by wireless communication with the communication apparatus. The obtaining unit obtains information representing a second position of a target viewed from the communication apparatus. The target is held by the communication apparatus, from the communication apparatus by the wireless communication. The display unit displays information representing a third position of the target viewed from the information processing apparatus based on the first position specified by the specifying unit and the second position represented by the information obtained by the obtaining unit.

15 Claims, 18 Drawing Sheets

FIG. 9

SERVICE 00000000-0000-1000-1000-00405f9b34fb

CHARACTERISTIC 00000000-0000-2000-1000-00405f9b34fb

DESCRIPTOR 00000000-0000-2000-1000-00405f9b3400

F I G. 10

| Service UUID | Service Name | Characteristic UUID | Characteristic Name | Service Read Enable | Service Write Enable | Characteristic Read enable | Characteristic Write enable | Characteristic indicatable | Value | Pairing need |
|---|---|---|---|---|---|---|---|---|---|---|
| 0x1801 | GATT Service | 0x2A05 | Service Changed | O | — | — | — | O | 0 | — |
| | | 0x2B2A | Database Hash | | | O | — | — | F0 CA 2D 48 EC F5 8B AC 8A AA 30 BB B9 FB A9 90 | — |
| 0x1801 | Device Information | 0x2A29 | Manufacturer Name String | O | — | O | — | — | Printer Device | — |
| | | 0x2A24 | Hardware Revision String | | | O | — | — | 1010_AAA | — |
| | | 0x2A25 | Firmware Revision String | | | O | — | — | 2030000 | — |
| | | 0x2A26 | Software Revision String | O | — | O | — | — | 0001 | — |
| 00000000-0000-1000-1000-004059b34fb | IJ Original | 00000000-0000-2000-1000-004059b34fb | SSID | | | O | — | — | Printer SSID | O |
| | | 00000000-0000-2000-1000-004059b34fc | Password | | | O | — | — | aaaabbbb | O |

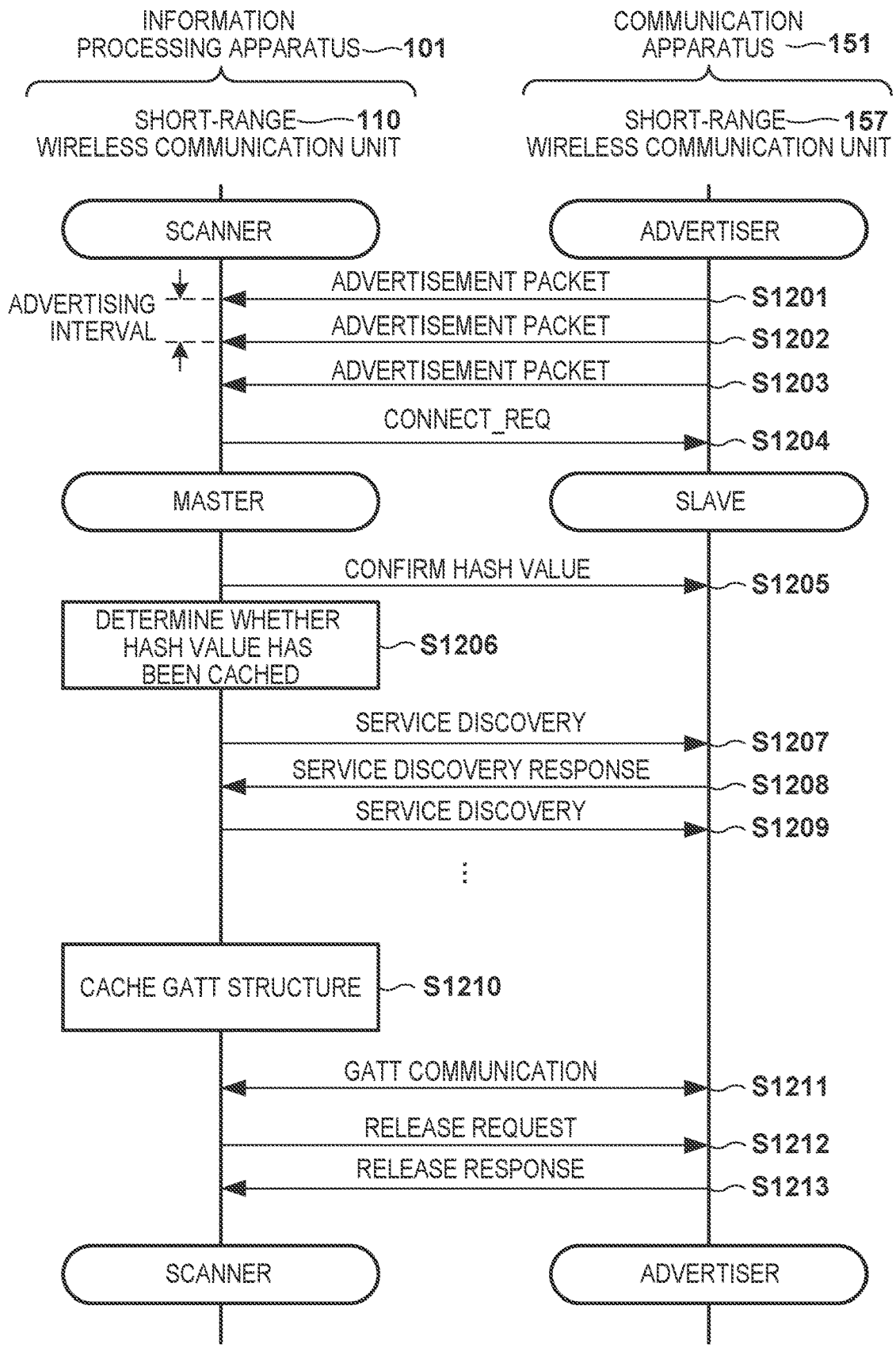

FIG. 14

| RELATIVE POSITION ID (1401) | COMMUNICATION APPARATUS ID (1402) | TARGET NAME (1403) | RELATIVE POSITION INFORMATION X (1404) | RELATIVE POSITION INFORMATION Y (1405) | RELATIVE POSITION INFORMATION Z (1406) |
|---|---|---|---|---|---|
| RELATIVE POSITION ID-A | COMMUNICATION APPARATUS ID-A | MERCHANDISE NAME A | +10 | +40 | +20 |
| RELATIVE POSITION ID-B | COMMUNICATION APPARATUS ID-B | MERCHANDISE NAME B | +10 | +10 | +70 |
| RELATIVE POSITION ID-C | COMMUNICATION APPARATUS ID-C | MERCHANDISE NAME C | -5 | 0 | +5 |
| RELATIVE POSITION ID-D | COMMUNICATION APPARATUS ID-D | MERCHANDISE NAME D | +30 | -60 | -60 |
| RELATIVE POSITION ID-E | COMMUNICATION APPARATUS ID-E | MERCHANDISE NAME E | -25 | -20 | -20 |

F I G. 17
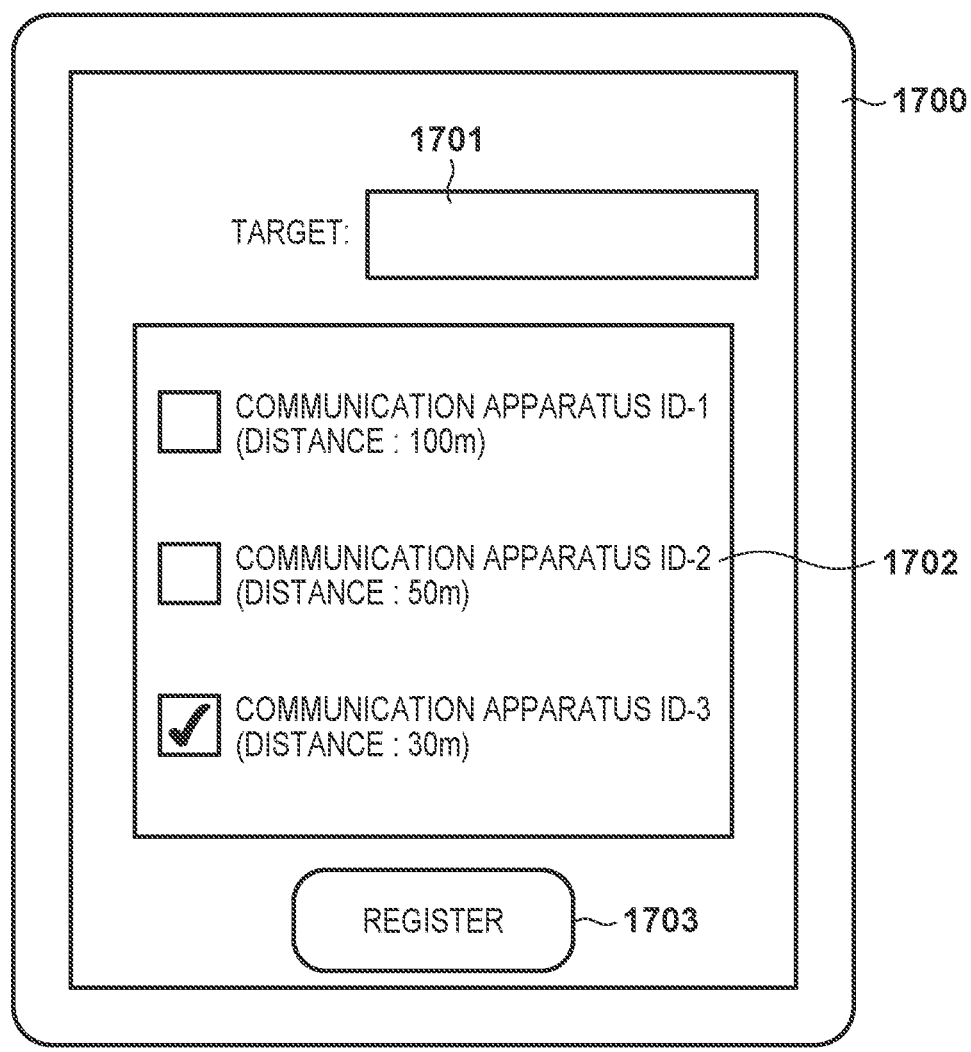

INFORMATION PROCESSING APPARATUS, INFORMATION PROCESSING METHOD, AND NON-TRANSITORY COMPUTER-READABLE STORAGE MEDIUM

BACKGROUND

Field

The present disclosure relates to a technique of providing information to a user.

Description of the Related Art

There exists a technique of, in an information processing apparatus, specifying a relative positional relationship with a predetermined target using a wireless communication technique and presenting information to a user based on the positional relationship (Japanese Patent Laid-Open No. 2016-110208).

If the target whose relative positional relationship should be specified does not have a wireless communication function common to the information processing apparatus, for example, if the target is an object that does not have a wireless communication function, the information processing apparatus cannot specify the relative position of the target.

SUMMARY

The present disclosure provides a technique of allowing an information processing apparatus to appropriately execute display based on the position of a target.

According to an aspect of the present disclosure, an information processing apparatus includes a specifying unit configured to specify a first position of a communication apparatus viewed from the information processing apparatus by wireless communication with the communication apparatus, an obtaining unit configured to obtain information representing a second position of a target viewed from the communication apparatus, which is held by the communication apparatus, from the communication apparatus by the wireless communication, and a display unit configured to display information representing a third position of the target viewed from the information processing apparatus based on the first position specified by the specifying unit and the second position represented by the information obtained by the obtaining unit.

Further features of the present disclosure will become apparent from the following description of exemplary embodiments (with reference to the attached drawings).

BRIEF DESCRIPTION OF THE DRAWINGS

FIG. 9 is a view showing the data format of GATT;

FIG. 10 is a view showing an example of GATT data stored in a communication apparatus;

FIG. 12 is a sequence chart showing an example of the procedure of processing concerning BLE communication;

FIG. 14 is a view showing an example of a relative position information DB;

FIG. 17 is a view showing an example of a screen for registration processing of the relative position information of a target;

DESCRIPTION OF THE EMBODIMENTS

Figure 1:
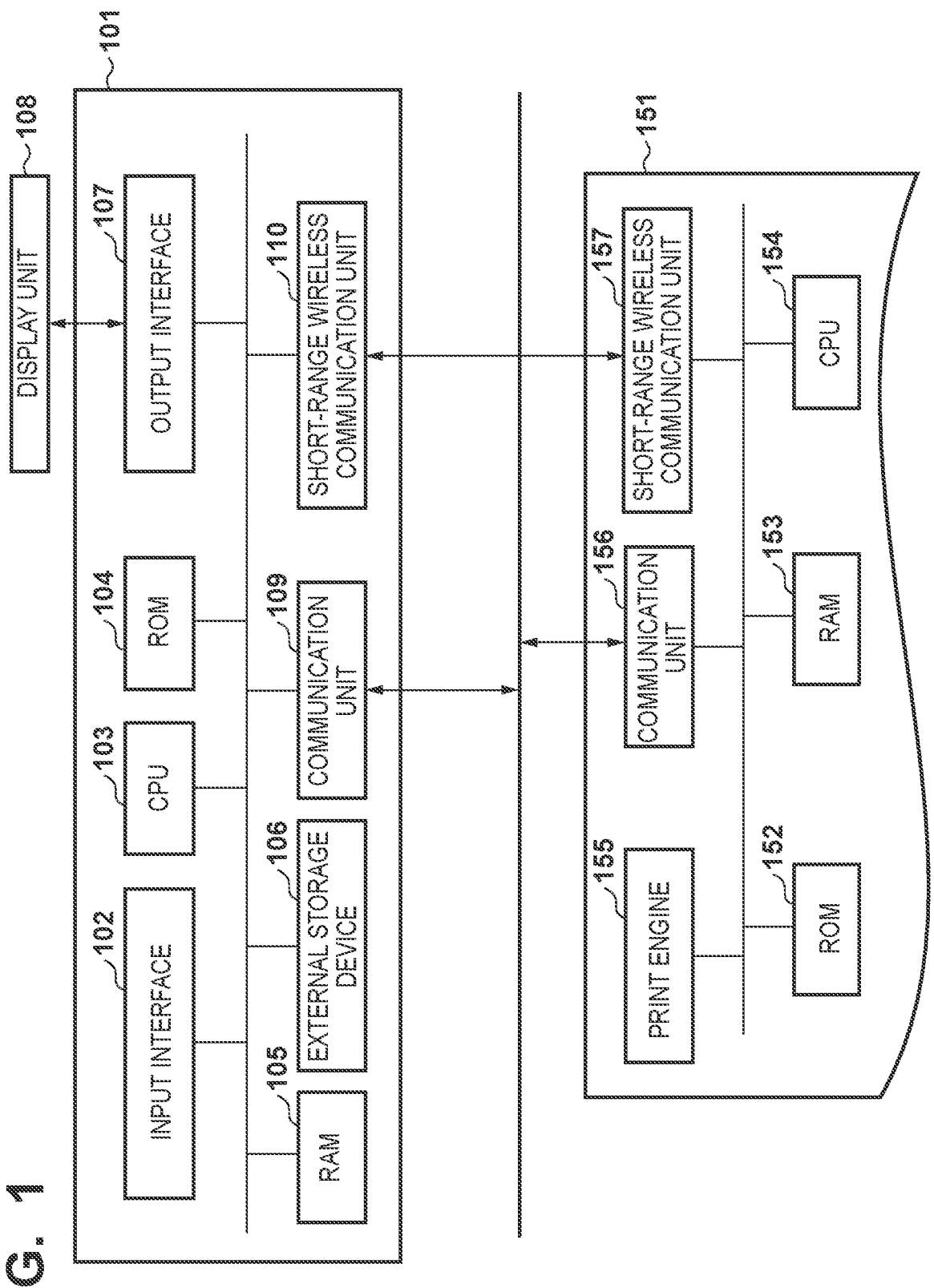
FIG. 1 is a block diagram showing an example of a system arrangement and examples of the hardware arrangements of apparatuses.

Hereinafter, embodiments will be described in detail with reference to the attached drawings. Note, the following embodiments are not intended to limit the scope of the disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

System and Apparatus Arrangements

An example of a system arrangement according to this embodiment will be described with reference to FIG. 1. This system includes an information processing apparatus 101 and a communication apparatus 151. The communication apparatus 151 is, for example, a printer, and print processing is executed by transmitting print data prepared by the information processing apparatus 101 to the communication apparatus 151 via a network. Note that communication between the information processing apparatus 101 and the communication apparatus 151 can be performed by, for example, a wireless LAN complying with the IEEE802.11 standard series. Note that another arrangement in which the information processing apparatus 101 and the communication apparatus 151 are communicable with each other may be used. A plurality of blocks shown in FIG. 1 may be integrated into one block, and one block may be divided into a plurality of blocks. In addition, a block other than those shown in FIG. 1 may be added, and one or more of the blocks shown in FIG. 1 may be omitted.

The information processing apparatus 101 can be, for example, a smartphone, but is not limited to this. For example, the information processing apparatus 101 may be a personal computer (PC), a portable terminal, a notebook PC, a tablet terminal, a PDA (Personal Digital Assistant), a digital camera, or the like. The communication apparatus 151 can be, for example, a printer such as an inkjet printer, a full-color laser beam printer, or a monochrome printer, but is not limited to this, and can be various types of communication apparatuses capable of performing wireless communication with the information processing apparatus 101. The communication apparatus 151 may be, for example, a copying machine, a facsimile apparatus, a portable terminal, a smartphone, a notebook PC, a tablet terminal, a PDA, a digital camera, a music playback device, a TV, and the like. The communication apparatus 151 may be, for example, a multi-function peripheral having a plurality of functions such as a copy function, a FAX function, and a print function.

The information processing apparatus 101 includes, for example, an input interface 102, a CPU 103, a ROM 104, a RAM 105, an external storage device 106, an output interface 107, a communication unit 109, and a short-range wireless communication unit 110. CPU, ROM, and RAM are acronyms for "Central Processing Unit", "Read Only Memory", and "Random Access Memory", respectively. Note that although FIG. 1 shows an example in which the information processing apparatus 101 displays information on a display device (display unit 108) such as an external display, the information processing apparatus 101 may include the display unit 108.

The input interface 102 is an interface for accepting a data input and an operation instruction from a user. The input interface 102 is formed by, for example, a physical keyboard, buttons, a touch panel, or the like. Note that the output interface 107 (to be described later) and the input interface 102 may be integrated so that output of a screen and acceptance of an operation from the user are performed using common hardware.

The CPU 103 is a system control unit, and controls the overall information processing apparatus 101. The ROM 104 stores permanent data such as control programs to be executed by the CPU 103, data tables, and an embedded operating system (to be referred to as an "OS" hereinafter) program. In this embodiment, the control programs stored in the ROM 104 perform software execution control such as scheduling, task switching, and interrupt processing under the management of the embedded OS stored in the ROM 104. The RAM 105 is implemented by an SRAM (Static Random Access Memory) or the like that needs a backup power supply. Note that the RAM 105 holds data by a primary battery (not shown) for data backup, and can thus store important data such as program control variables without volatilizing them. The RAM 105 can be provided with a memory area to store setting information and management data of the information processing apparatus 101, and the like. The RAM 105 can also be used as the main memory and work memory of the CPU 103.

The external storage device 106 stores an application for providing a print execution function, a print information generation program for generating print information interpretable by the communication apparatus 151, and the like. In addition, the external storage device 106 may store a program for an application for providing an information notification function. The external storage device 106 can also store various kinds of programs such as a control program for transmitting/receiving information to/from another apparatus (for example, the communication apparatus 151) connected via the communication unit 109, and various kinds of information to be used by these programs.

The output interface 107 is an interface used by the display unit 108 to perform information presentation control (information display control) for displaying data and presenting information of the state of the information processing apparatus 101. The output interface 107 outputs control information and display target information for causing the display unit 108 to display the information. The display unit 108 includes an LED (Light Emitting Diode) and LCD (Liquid Crystal Display), and displays data and notifies the user of the state of the information processing apparatus 101. Note that a software keyboard including keys such as numeric input keys, a mode setting key, an enter key, a cancel key, and a power key may be displayed on the display unit 108, and an input from the user may be accepted via the software keyboard.

The communication unit 109 includes a radio frequency (RF) circuit and a baseband circuit for executing data communication by performing connection to an external apparatus such as the communication apparatus 151. For example, the communication unit 109 can communicate with the communication apparatus 151 via an external access point existing separately from the information processing apparatus 101 and the communication apparatus 151. The external access point can be, for example, a device such as a wireless LAN router that operates in accordance with a wireless communication method complying with the IEEE802.11 standard series. Furthermore, the communication unit 109 may establish direct connection to the communication apparatus 151 in accordance with a protocol such as Wi-Fi (Wireless Fidelity) Direct®. If the communication apparatus 151 includes an access point (not shown), the communication unit 109 may be connected to the access point to establish direct connection to the communication apparatus 151. Note that the communication unit 109 can be configured to perform communication by Wi-Fi® but may perform communication by another wireless communication method such as Bluetooth®. Note that a method of connecting the information processing apparatus 101 and the communication apparatus 151 directly without an intervention of an external access point is sometimes referred to as a direct connection method. In addition, a method of connecting the information processing apparatus 101 and the communication apparatus 151 via an external access point is sometimes referred to as an infrastructure connection method.

The short-range wireless communication unit 110 executes data communication by establishing wireless connection to a short-range wireless communication unit 157 of the communication apparatus 151 based on at least the fact that the communication apparatus 151 (external apparatus) enters a predetermined short range area. Note that in this embodiment, the short-range wireless communication unit 110 performs wireless communication complying with the Bluetooth Low Energy (BLE) standard. Note that the short-range wireless communication unit 110 may use a wireless communication method different from BLE as long as communication can be performed by a communication method that can execute wireless communication in a short range different from the communication unit 109. For example, BLE is included in the Bluetooth 5.1 standard, and the short-range wireless communication unit 110 may operate complying with Classic Bluetooth included in this standard.

The communication apparatus 151 includes, for example, a ROM 152, a RAM 153, a CPU 154, a print engine 155, a communication unit 156, and the short-range wireless communication unit 157.

The communication unit 156 includes a radio frequency (RF) circuit and a baseband circuit for performing connection to an external apparatus such as the information processing apparatus 101. The communication unit 156 corresponds to the communication unit 109 of the information processing apparatus 101, and performs communication by a wireless communication method such as Wi-Fi® or Bluetooth®. The communication unit 156 may be directly connected to the communication unit 109 of the information processing apparatus 101 by functioning as an access point or in accordance with a predetermined protocol, as described above, or may be connected to the communication unit 109 via the external access point or the like. If the communication unit 156 functions as an access point, the communication unit 156 may have hardware for functioning as an access point, or may use software that allows the communication unit 156 to function as an access point. In addition, the information processing apparatus 101 and the communication apparatus 151 may be connected to different access points connected to the network, and may be connected to each other via the network.

The short-range wireless communication unit 157 executes data communication by establishing wireless connection to the short-range wireless communication unit 110 of the information processing apparatus 101 based on at least the fact that the information processing apparatus 101 (external apparatus) enters a predetermined short range area. The short-range wireless communication unit 157 corresponds to the short-range wireless communication unit 110 of the information processing apparatus 101 and, in this embodiment, performs wireless communication by a wireless communication method complying with the BLE standard. Note that, for example, print information transmitted from the information processing apparatus 101 or the like has a large amount of data, requires high-speed large-capacity communication, and can thus be received via the communication unit 156 capable of performing communication at a speed higher than that of the short-range wireless communication unit 157.

The RAM 153 is a memory similar to the RAM 105. The RAM 153 is provided with a memory area to store setting information and management data of the communication apparatus 151, and the like. The RAM 153 is also used as the main memory and work memory of the CPU 154, functions as a reception buffer for temporarily storing print information received from the information processing apparatus 101 or the like, and also stores various kinds of information. The ROM 152 stores permanent data such as control programs to be executed by the CPU 154, data tables, and an OS program. When the CPU 154 executes the control programs stored in the ROM 152, software execution control such as scheduling, task switching, and interrupt processing can be executed under the management of the embedded OS stored in the ROM 152. The CPU 154 is a system control unit, and controls the overall communication apparatus 151. Note that a memory such as an external HDD or SD card may be mounted as an optional device on the communication apparatus 151, and the information stored in the communication apparatus 151 may be stored in such memory.

The print engine 155 forms an image on a print medium such as a sheet using a printing material such as ink based on the information stored in the RAM 153 or a print job received from the information processing apparatus 101 or the like, and outputs a print result.

Note that a memory such as an external HDD or an SD card may be attached as an optional device to the communication apparatus 151, and information stored in the communication apparatus 151 may be stored in these devices. Additionally, the above-described processing sharing between the information processing apparatus 101 and the communication apparatus 151 is merely an example, and processing sharing may be done in another form.

In this embodiment, the information processing apparatus 101 stores a predetermined application in the ROM 104, the external storage device 106, or the like. The predetermined application is, for example, an application program configured to transmit print information to print image data or document data in the information processing apparatus 101 to the communication apparatus 151. An application having such a function will be referred to as a "print application" hereinafter. Note that the print application may have functions other than the print function. For example, if the communication apparatus 151 has a scan function, the print application may include a function of scanning an original set on the communication apparatus 151, a function of doing other settings for the communication apparatus 151, a function of confirming the state of the communication apparatus 151, and the like. That is, the print application may have a function of transmitting not only print information but also a scan job or a setting job to the communication apparatus 151. In addition, the above-described predetermined application is not limited to the print application, and may be an application program corresponding to a function other than printing.

Outline of Advertisement

Figure 2:
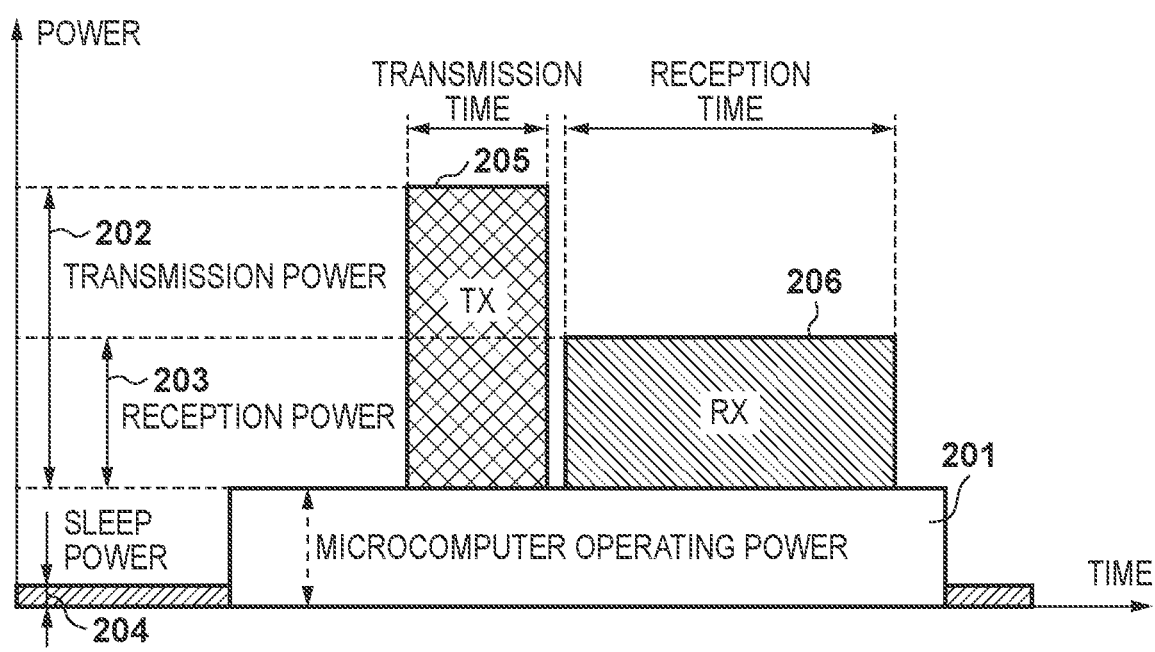
FIG. 2 is a view showing the outline of processing of transmission of advertisement information and reception of connection request information.

As described above, the short-range wireless communication unit 110 and the short-range wireless communication unit 157 communicate by BLE. In this embodiment, the short-range wireless communication unit 157 functions as an advertiser (or slave) that broadcasts advertisement information to be described later, and the short-range wireless communication unit 110 functions as a scanner (or master) that receives the advertisement information. Processing of transmission of advertisement information in the BLE standard and reception of a BLE connection request will be described here. In this embodiment, the short-range wireless communication unit 157 operating as a slave device performs the processing of transmission of advertisement information and reception of a BLE connection request. In BLE, a frequency band of 2.4 GHz is divided into 40 channels (0ch to 39ch), and communication using these channels is performed. Note that of these channels, the 37th to 39th channels are used for transmission of advertisement information or reception of a BLE connection request, and the 0th to 36th channels are used for data communication after BLE connection. FIG. 2 shows power consumption when transmitting advertisement information using one channel for each processing. Note that in FIG. 2, the ordinate represents the power consumption of the short-range wireless communication unit 157, and the abscissa represents time. TX 205 represents total power consumption in transmission processing that is processing of broadcasting advertisement information. RX 206 represents total power consumption in reception processing that is processing of keeping a receiver used to receive a BLE connection request enabled. As described above, the short-range wireless communication unit 157 performs transmission processing (TX 205) using a predetermined channel and then performs reception processing (RX 206) for a predetermined time using the same channel, thereby waiting for transmission of a BLE connection request from the information processing apparatus 101. Transmission power 202 represents instantaneous power consumption by transmission processing. Reception power 203 represents instantaneous power consumption by reception processing. Microcomputer operating power 201 represents instantaneous power consumption in a case in which a microcomputer in the short-range wireless communication unit 157 is operating. Note that to execute or stop signal transmission/reception processing, the microcomputer needs to be activated. Hence, settings are done such that the microcomputer operates during the periods of the TX 205 and the RX 206 and before and after the periods. If transmission of advertisement information is performed using a plurality of channels, power consumption increases by the number of channels used to transmit advertisement information and wait for reception of the BLE connection request. During a time when the microcomputer is not performing the operation, and the short-range wireless communication unit 157 is in a power saving state, the instantaneous power consumption is suppressed up to sleep power 204.

Figure 3:
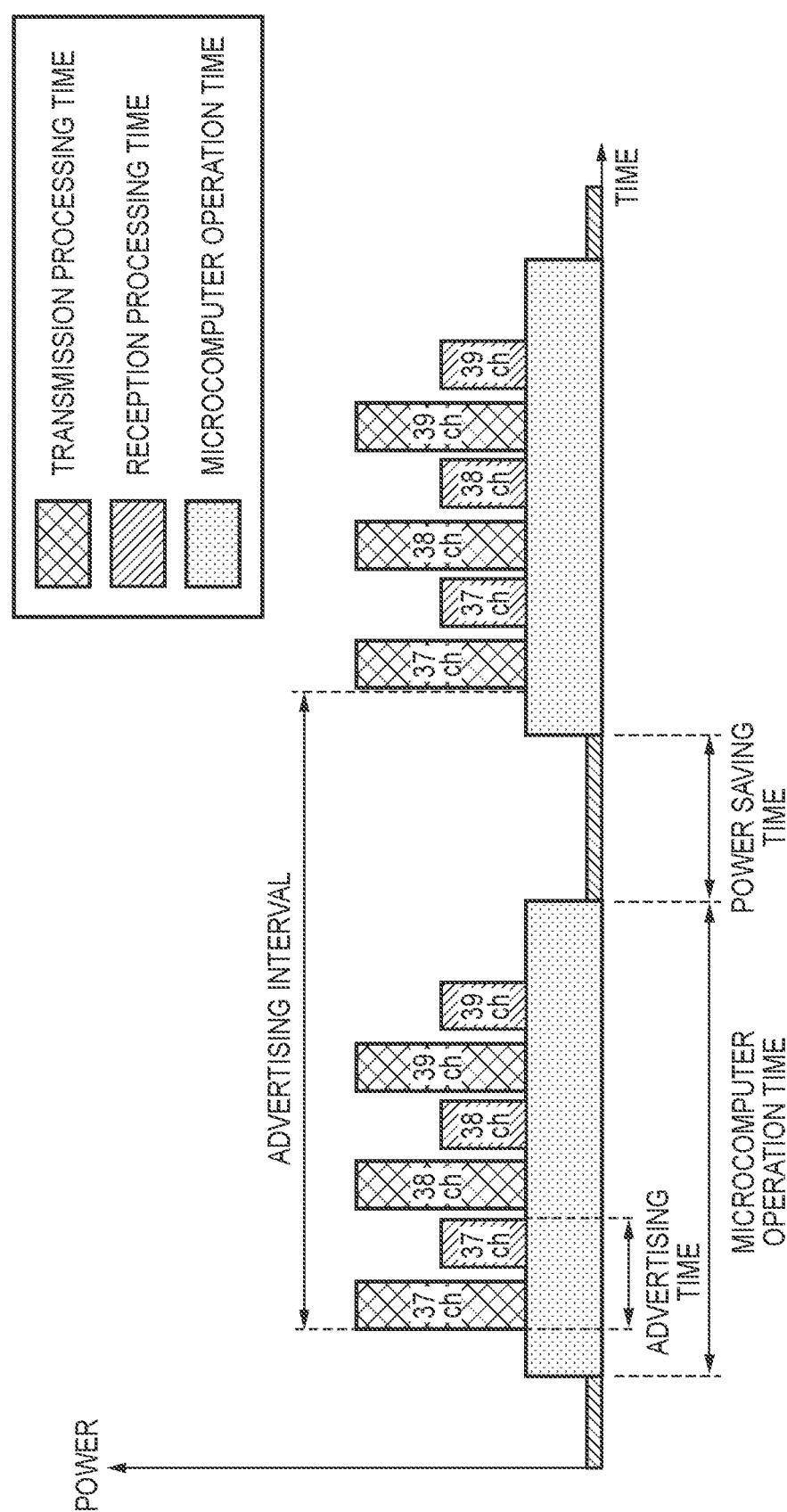
FIG. 3 is a view showing the outline of processing of an advertisement in BLE.

Additionally, as shown in FIG. 3, the short-range wireless communication unit 157 repeats the transmission processing and the reception processing of advertisement information once for each of three channels, that is, a total of three times, and after that, stops the operation of the microcomputer, and transitions to the power saving state for a predetermined time. A combination of advertisement information transmission processing and BLE connection request reception processing by a predetermined channel will be referred to as advertisement hereinafter. In addition, a time interval from advertisement information transmission by a predetermined channel to the next advertisement information transmission by that channel will be referred to as an advertisement interval. Note that the number of advertisement information repetitively transmitted from the first advertisement information transmission to the power saving state can be set to an arbitrary number of three or less. FIG. 3 shows an example in which, as the channels at the time of advertisement, the 37th channel, the 38th channel, and the 39th channel are sequentially used in this order. However, the present disclosure is not limited to this. The order may be random. The order may change between the first advertisement, the second advertisement, and the third and subsequent advertisement.

Figure 4:
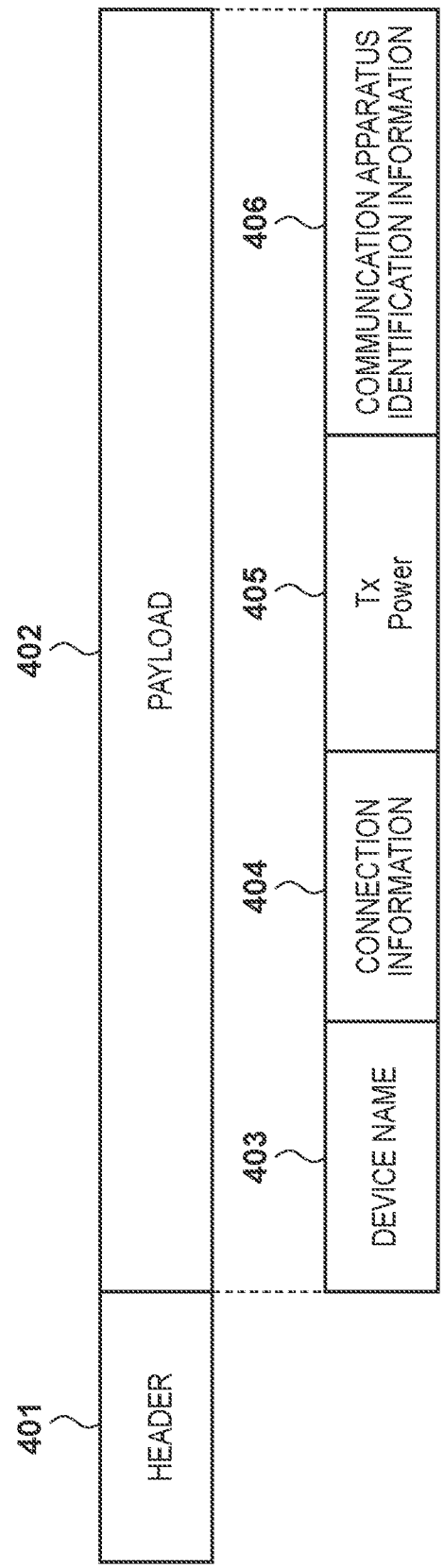
FIG. 4 is a view showing an example of the structure of advertisement information.

FIG. 4 shows an example of the structure of advertisement information broadcast by the short-range wireless communication unit 157 to the periphery of the communication apparatus 151.

When power supply is started by, for example, powering on the communication apparatus 151, the short-range wireless communication unit 157 performs initialization processing and transitions to an advertising state. When transitioning to the advertising state, the short-range wireless communication unit 157 periodically broadcasts advertisement information to the periphery at a period corresponding to the advertisement interval. The short-range wireless communication unit 157 may transition to the advertising state and start transmission of advertisement information when, for example, a predetermined operation for enabling the BLE function is performed. Advertisement information is a signal including basic header information (identification information used to identify an apparatus that transmits the advertisement information), and includes a header 401 and a payload 402. The information processing apparatus 101 receives the advertisement information, thereby recognizing the presence of the communication apparatus 151. Furthermore, based on the information of the communication apparatus 151 obtained by the advertisement information, the information processing apparatus 101 transmits a BLE connection request to the communication apparatus 151, and can therefore be BLE-connected to the communication apparatus 151. The header 401 is an area where the PDU (Protocol Data Unit) type of advertisement information, the information of the size of the payload 402, and the like are stored. The payload 402 stores information such as a device name 403 serving as identification information, mounted profile information, connection information 404 used to BLE-connect the communication apparatus 151, and transmission power (Tx Power) 405 of the advertisement information. Note that identification information 406 of the communication apparatus 151 may be included in the advertisement information. The identification information 406 of the communication apparatus 151 includes, for example, the MAC address of the communication apparatus 151. The identification information 406 of the communication apparatus 151 may include the service information of the communication apparatus 151, the S SID of the access point in the communication apparatus 151, a password, or the like.

Note that the short-range wireless communication unit 157 may transmit first advertisement information, and upon receiving a scan response to the first advertisement information from the information processing apparatus 101, transmit second advertisement information including contents different from those of the first advertisement information. In an example, the first advertisement information includes information concerning the transmission power of advertisement information, the identification information of the short-range wireless communication unit 157, and the like. The second advertisement information includes, for example, the identification information of the communication apparatus 151, information concerning the functions and hardware of the communication apparatus 151, and the like. In this example, the print application is designed to handle second advertisement information. Hence, in the following explanation, advertisement information handled by the print application indicates the second advertisement information.

Position Estimation

In Bluetooth 5.1, based on a signal transmitted by the device on the transmitting side, the device on the receiving side can estimate the direction in which the device on the transmitting side exists. For example, based on advertisement information of BLE transmitted by the device on the transmitting side, the device on the receiving side can estimate the direction in which the device on the transmitting side exists. A method of estimating, by the information processing apparatus 101 (scanner), the direction in which the communication apparatus 151 (advertiser) exists will be described below with reference to FIGS. 5 to 8. For example, as shown in FIG. 6, the short-range wireless communication unit 110 in the information processing apparatus 101 can include antennas 601 to 603, and the short-range wireless communication unit 157 in the communication apparatus 151 can include antennas 604 to 606. Note that these are merely examples, and each of the short-range wireless communication unit 110 and the short-range wireless communication unit 157 may include only one or two antennas, or may include four or more antennas. The number of antennas included in the short-range wireless communication unit 110 may be different from the number of antennas included in the short-range wireless communication unit 157. FIG. 6 shows an example in which the antennas are arranged on a line in the short-range wireless communication unit 110 and the short-range wireless communication unit 157. However, the present disclosure is not limited to this. For example, the antennas may be arranged two-dimensionally on a plane, or may be arranged three-dimensionally.

Figure 5:
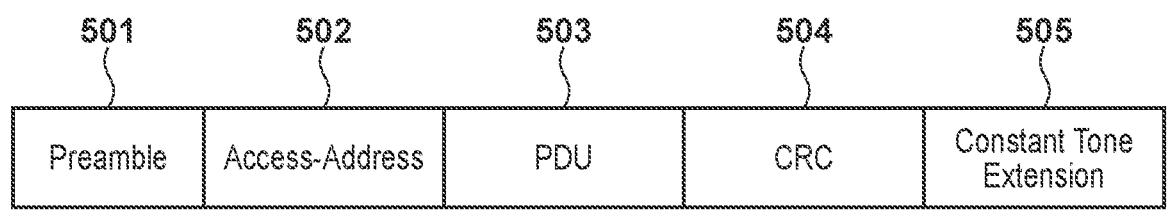
FIG. 5 is a view showing the structure of advertisement information when performing direction detection in BLE.
Figure 6:
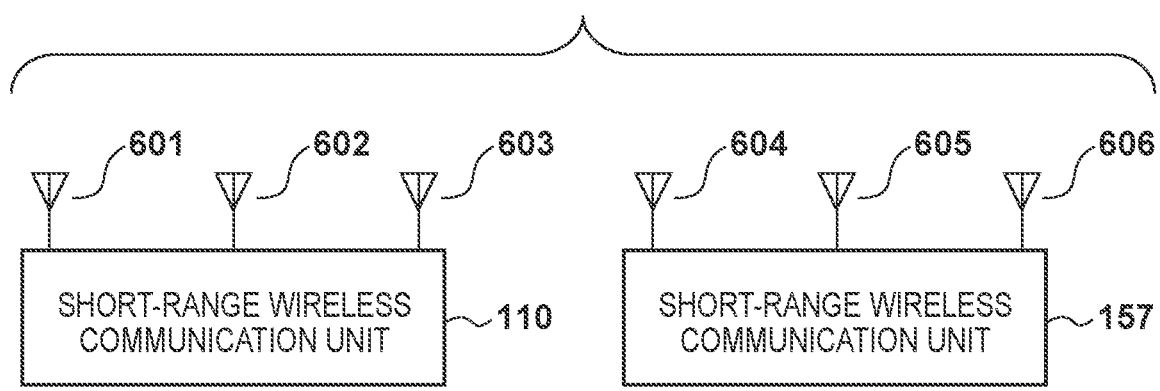
FIG. 6 is a view showing an example of the arrangement of short-range wireless communication units that execute direction estimation processing.

FIG. 5 is a view showing an example of the structure of advertisement information transmitted by the short-range wireless communication unit 157 in the communication apparatus 151 to cause the information processing apparatus 101 to detect the distance to the communication apparatus 151 and the direction of the position of the communication apparatus 151. A constant tone extension (CTE 505) is data used to detect the direction of the communication apparatus 151 with respect to the information processing apparatus 101. A preamble 501 is data for clock synchronization used when the information processing apparatus 101 receives advertisement information of the communication apparatus 151. Access-address 502 is data for frame synchronization used when the information processing apparatus 101 receives advertisement information of the communication apparatus 151. PDU 503 is an actual data portion in advertisement information transmitted by the communication apparatus 151. Note that the header 401 and the payload 402 included in advertisement information shown in FIG. 4 are included in the PDU 503. CRC 504 is the error detection code value of the PDU 503 at the time of communication.

The methods of the information processing apparatus 101 to estimate the direction of the communication apparatus 151 are classified into (1) a method in a case in which the short-range wireless communication unit 110 (receiving side) includes a plurality of antennas, and (2) a method in a case in which the short-range wireless communication unit 157 (transmitting side) includes a plurality of antennas.

The method (1) of these methods will be described with reference to FIG. 7. In the arrangement shown in FIG. 7, using the plurality of antennas of the short-range wireless communication unit 110 that is the receiving-side apparatus, the short-range wireless communication unit 110 estimates the angle of arrival of a received radio wave based on the phase difference between radio waves when arrived at the antennas. The angle of arrival will sometimes be referred to as an AoA hereinafter.

Figure 7:
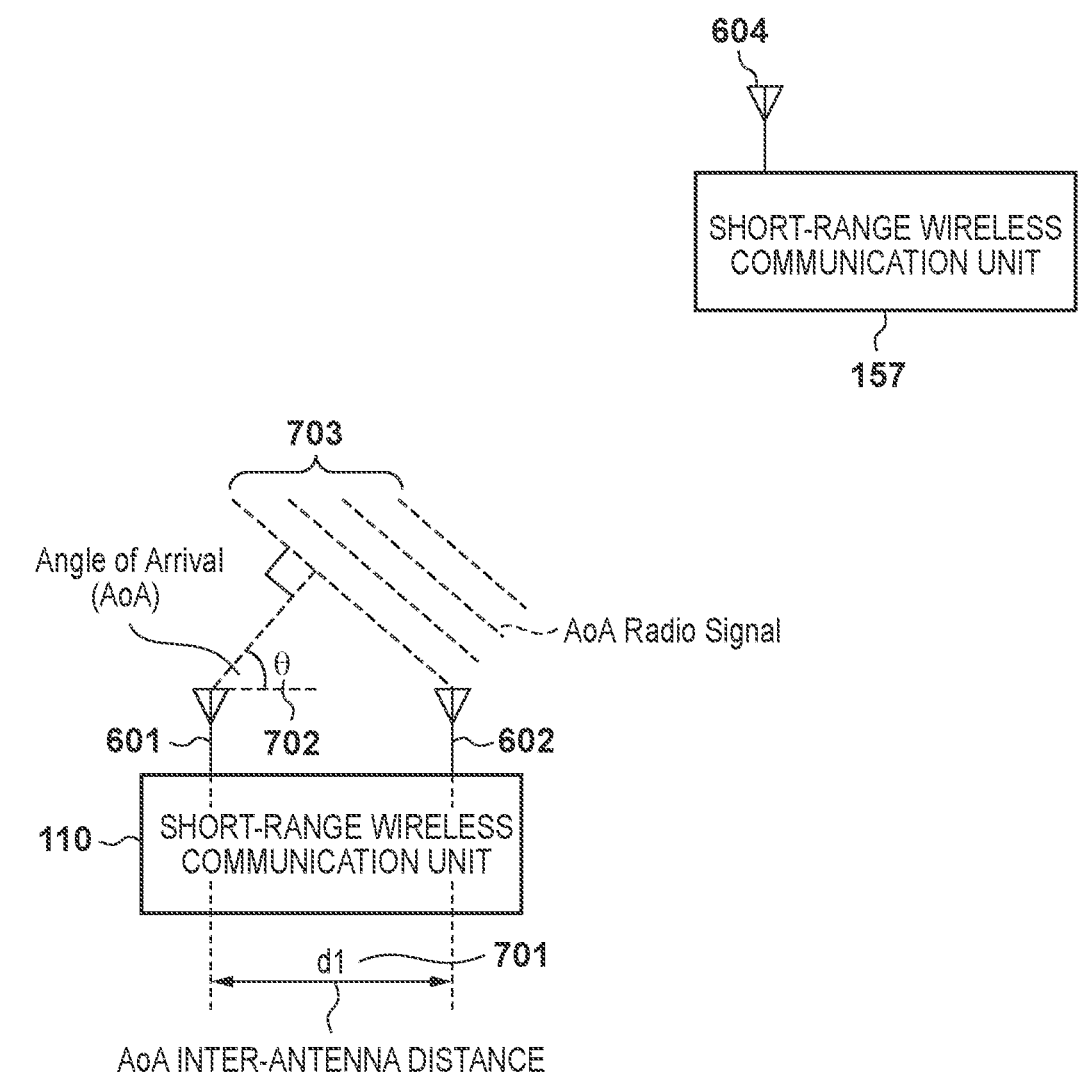
FIG. 7 is a view for explaining the principle of direction estimation processing.

In FIG. 7, the short-range wireless communication unit 157 transmits advertisement information by a radio frame (AoA radio signal 703) using the antenna 604. Note that the radio frame here is a radio frame as shown in FIG. 5. However, the radio frame is not limited to this, and, for example, a conventional radio frame or a radio frame of another form such as a radio frame of the Classic Bluetooth standard may be used. A radio frame including information other than advertisement information may be used for direction estimation. The short-range wireless communication unit 110 receives the radio frame by the plurality of antennas (both the antenna 601 and the antenna 602). At this time, an inter-antenna distance 701 between the antenna 601 and the antenna 602 is d1, and an AoA 702 is θ. In this case, the radio wave to be received by the antenna 601 is received in a distance longer by d1×cos(θ) than the radio wave received by the antenna 602. For this reason, letting λ be the wavelength of the radio wave, the phase of the radio wave received by the antenna 601 delays, as compared to the phase of the radio wave received by the antenna 602, by a difference φ1 between the phase of the radio wave received by the antenna 602 and the phase of the radio wave received by the antenna 601

$$\varphi 1 = 2\pi \times (d1 \times \cos(\theta)/\lambda) \quad (1)$$

From equation (1), the AoA 702 can be calculated by $$\theta = \arccos((\varphi 1 \times \lambda)/(2\pi \times d1)) \quad (2)$$

Hence, by calculating equation (2), the information processing apparatus 101 can estimate the direction of the communication apparatus 151.

The method (2) of the above-described methods will be described next with reference to FIG. 8. In the arrangement shown in FIG. 8, advertisement information is transmitted from the plurality of antennas of the short-range wireless communication unit 157 that is the transmitting-side apparatus by a radio frame (AoD radio signal 803) in different periods. The radio frame here can also be a radio frame to which CTE is added, as shown in FIG. 5. However, a conventional radio frame or a radio frame of another form such as a radio frame of the Classic Bluetooth standard may be used. A radio frame including information other than advertisement information may be used for direction estimation. Here, for example, as shown in 810 of FIG. 8, the transmission period of the AoD radio signal 803 from the antenna 604 is set, and immediately after that, the transmission period of the AoD radio signal 803 from the antenna 605 is set. In this case, in the short-range wireless communication unit 157, no silent section is generated between the transmission of the AoD radio signal 803 from the antenna 604 and the transmission of the AoD radio signal 803 from the antenna 605. On the other hand, the short-range wireless communication unit 110 can receive these radio signals in a form as shown in 820 of FIG. 8. That is, since the signal transmitted from the antenna 605 arrives at the short-range wireless communication unit 110 with a delay via a path longer than that of the signal transmitted from the antenna 604, a silent section is generated between the signals. In addition, if the antenna 605 transmits the signal first, the signal transmitted from the antenna 604 arrives at the short-range wireless communication unit 110 before signal transmitted from the antenna 605 wholly arrives at the short-range wireless communication unit 110. If a silent section of a predetermined length is set after completion of the signal transmission period of the antenna 604, and the signal transmission period from the antenna 605 is then set, the silent section is observed longer than the predetermined length in the radio signal received by the short-range wireless communication unit 110. Similarly, if a silent section of a predetermined length is set after completion of the signal transmission period of the antenna 605, and the signal transmission period from the antenna 604 is then set, the silent section is observed shorter than the predetermined length in the radio signal received by the short-range wireless communication unit 110. In this way, the signals transmitted from the plurality of antennas are observed as the shift of timing according to the path lengths in the short-range wireless communication unit 110. Note that to observe the shift of timing, the short-range wireless communication unit 110 is notified, in advance, of scheduling information representing which antenna transmits a signal at which timing (by, for example, the short-range wireless communication unit 157 or another apparatus).

Note that the shift of reception timing corresponds to the shift of the phase of the received signal. For example, in the example shown in FIG. 8, the signal transmitted from the antenna 605 arrives at the short-range wireless communication unit 110 in a path longer by d2×cos(φ) than the signal transmitted from the antenna 604. Here, d2 [m] is an inter-antenna distance 801 between the antenna 604 and the antenna 605. Because of the path length difference, letting c [m/sec] be the propagation speed of light, a reception timing shift of d2×cos(φ) sec occurs. Simultaneously, a phase difference represented by $$\varphi 2 = 2\pi \times d2 \times \cos(\varphi)/\lambda \quad (3)$$

is generated. Note that λ [m] is the wavelength of the radio wave, as described above. In addition, φ is the angle made by a straight line that connects the short-range wireless communication unit 157 and the short-range wireless communication unit 110 and a straight line that connects the antenna 604 and the antenna 605. Note that the angle is called an angle of departure, and will be referred to as an AoD 802 hereinafter. The short-range wireless communication unit 110 can specify the phase difference φ2 by performing correlation detection using, as a reference, for example, the signal received first in a plurality of signals transmitted from the short-range wireless communication unit 157. From equation (3), the short-range wireless communication unit 110 can calculate, using the phase difference φ2, the AoD 802 as $$\varphi = \arccos((\varphi 2 \times \lambda)/(2\pi \times d2)) \quad (4)$$

Note that the short-range wireless communication unit 110 obtains the information of the inter-antenna distance d2 in advance from, for example, the short-range wireless communication unit 157 or another apparatus. The short-range wireless communication unit 110 calculates the AoD 802 as indicated by equation (4), thereby specifying the direction of the short-range wireless communication unit 110 viewed from the short-range wireless communication unit 157. In addition, the short-range wireless communication unit 110 can estimate the direction of arrival of the radio wave based on the AoD 802 by knowing how the antenna 604 and the antenna 605 are arranged. That is, if the antenna 604 is arranged on the west side of the antenna 605, and the AoD 802 is estimated as 45°, the short-range wireless communication unit 110 can estimate that the radio wave has arrived from the south east direction.

Furthermore, the short-range wireless communication unit 110 can estimate the distance from the short-range wireless communication unit 157 based on the received strength of the radio wave and the transmission power of the radio wave. This makes it possible to recognize the distance and direction relationship with the short-range wireless communication unit 157. Additionally, the short-range wireless communication unit 110 obtains the information of the position where the short-range wireless communication unit 157 is arranged, thereby accurately estimating the position of the self-apparatus.

Figure 8:
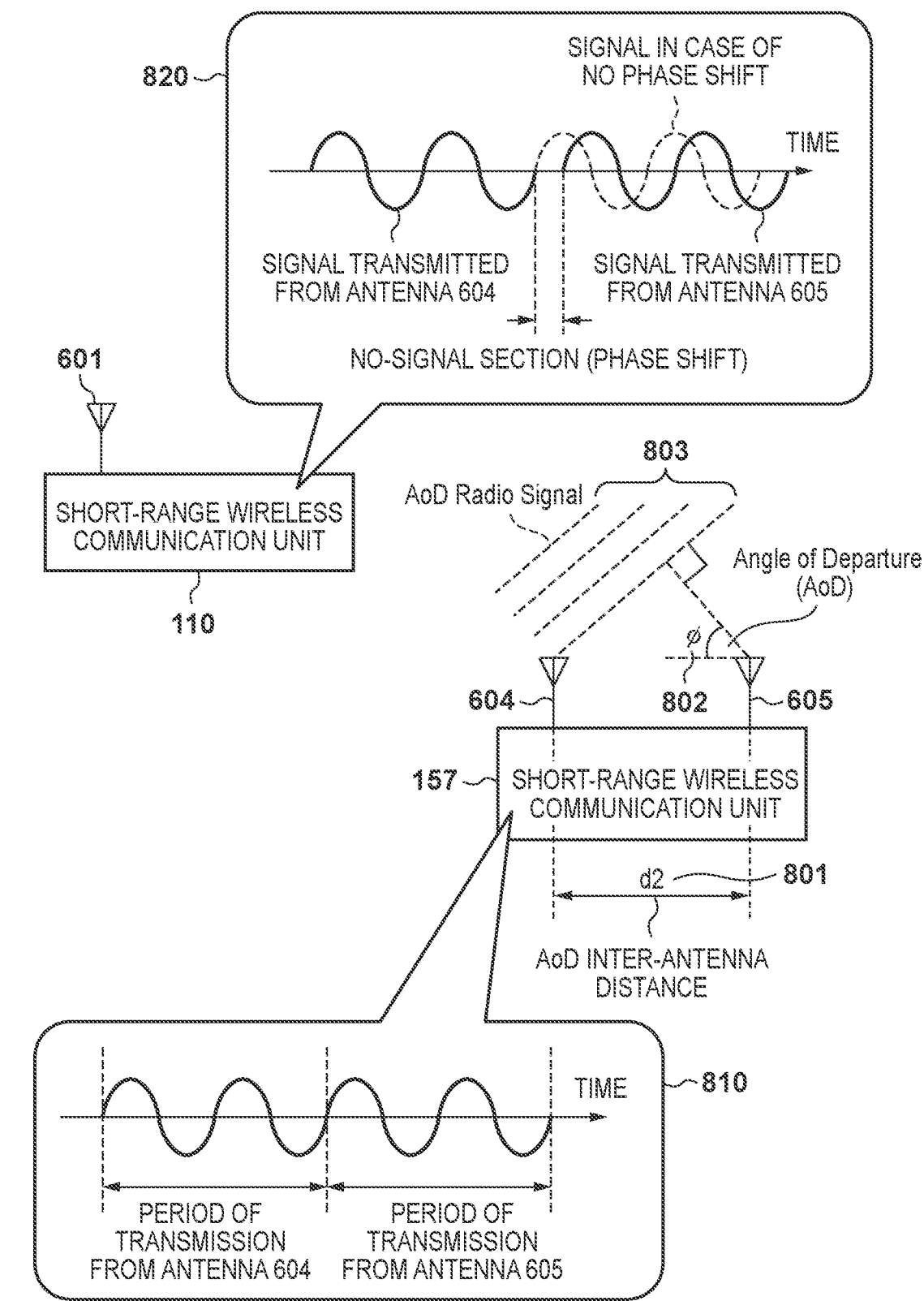
FIG. 8 is a view for explaining the principle of direction estimation processing.

Note that the short-range wireless communication units shown in FIGS. 7 and 8 include only some of the antennas shown in FIG. 6. However, they may include three antennas, like the antennas shown in FIG. 6, as a matter of course, or may include more antennas. For example, the short-range wireless communication unit 110 may use three or more antennas, calculate an AoA for each of the plurality of pairs of antennas, and estimate the average value as the AoA 702. Similarly, for signals transmitted from three or more antennas used in the short-range wireless communication unit 157, the short-range wireless communication unit 110 may calculate an AoD for each of the plurality of pairs of antennas and estimate the average value as the AoD 802. Note that both the short-range wireless communication unit 110 and the short-range wireless communication unit 157 may include a plurality of antennas. The same position specifying method can be applied using a wireless communication function different from the BLE function.

In the above-described example, a method of estimating, by the information processing apparatus 101, the direction in which one communication apparatus 151 exists has been described. However, the present disclosure is not limited to this. The information processing apparatus 101 may estimate the position and direction relationship with two or more communication apparatuses 151. By estimating the position and direction relationship with two or more communication apparatuses 151 and using the estimation results, the information processing apparatus 101 can accurately estimate the distance between the apparatuses and the directions and positions of the apparatuses.

GATT Communication

The outline of GATT (Generic Attribute Profile) communication in the BLE standard will be described. GATT is a profile that controls read and write (transmission/reception) of information in the BLE standard. GATT defines two roles of a GATT client and a GATT server based on the transfer source and transfer destination of data. The GATT client has a role of transmitting a request to the GATT server and receiving a response from the GATT server. The GATT server has a role of returning a response upon receiving the request from the GATT client. Note that the GATT server operates as a device that stores information such as the state information of the GATT server. In this embodiment, the information processing apparatus 101 serves as the GATT client, and the communication apparatus 151 serves as the GATT server. That is, the information processing apparatus 101 transmits a request to the communication apparatus 151, and performs communication for read of various kinds of data stored in the storage area of the communication apparatus 151 and data such as state information and write of data in the storage area.

The data format of GATT will be described next. GATT data has a hierarchical structure as shown in FIG. 9, which includes three elements called a service, a characteristic, and a descriptor. Each of the service, the characteristic, and the descriptor can be identified by a UUID (Universally Unique Identifier) of 32 digits, which is assigned to each element. If one service includes a plurality of characteristics, a single UUID is assigned to each characteristic, and information defined by the BLE standard or information defined by the user is identified. The GATT client designates UUIDs corresponding to the services and the characteristics, thereby executing read/write for a value held on a characteristic basis. Here, the UUID is used as an identifier configured to uniquely identify an object on software. The UUID is a 128-bit numerical value and is normally expressed in hexadecimal as, for example, 550e8400-e29b-41d4-a716-446655440000. Note that some services, characteristics, and descriptors are defined by the standard of Bluetooth Special Interest Group (Bluetooth SIG) or are unique to a vendor. The UUID of an element unique to a vendor is expressed by 32 digits, as described above. On the other hand, the UUID of an element defined by the standard of Bluetooth SIG is expressed by four digits. For example, the UUID of an element defined by the standard of Bluetooth SIG can be expressed as 2A49.

A service puts attributes in GATT data into groups based on a common part, and each service includes one or more characteristics. When a plurality of characteristics are used, different pieces of information can be held. As for a characteristic, a single value is set for each characteristic. For a descriptor, an attribute value used when additional information is necessary for a characteristic is set. The descriptor may be absent. In this embodiment, the descriptor does not exist in GATT data constructed by the short-range wireless communication unit 157. A set value representing whether to allow the GATT client to do read or write can be set as a read/write attribute for each of the service, the characteristic, and the descriptor. Whether read/write can be executed is based on the read/write attribute set for each of the service and the characteristic.

FIG. 10 shows an example of GATT data constructed by the short-range wireless communication unit 157 according to this embodiment. In FIG. 10, "service UUID" represents a UUID assigned to each service, and "service name" is the name of each service. "Characteristic UUID" represents a UUID assigned to each characteristic, and "characteristic name" is the name of each characteristic. "Service read enable" represents whether the information processing apparatus 101 is permitted to read a value concerning each service. "Service write enable" represents whether the information processing apparatus 101 is permitted to write a value concerning each service. "Characteristic read enable" represents whether the information processing apparatus 101 is permitted to read a value concerning each characteristic. "Characteristic write enable" represents whether the information processing apparatus 101 is permitted to write a value concerning each characteristic. Note that in the example shown in FIG. 10, for each characteristic, "O" added to the read enable field represents that read is permitted. Similarly, for each characteristic, "O" added to the write enable field represents that write is permitted. Note that inhibition of read is represented by making the read enable field blank, and inhibition of write is represented by making the write enable field blank. The information processing apparatus 101 can read a value concerning a characteristic for which "O" is added to the "service read enable" field, and "O" is added to the "characteristic read enable" field. The information processing apparatus 101 cannot read a value concerning a characteristic for which "O" is added to the "service read enable" field, and the "characteristic read enable" field is blank.

"Characteristic indicatable" represents that if the communication apparatus 151 updates a value for a characteristic with "O", the information processing apparatus 101 can be notified (indicated) of it. "Pairing need" represents that for a characteristic with "O", write/read is not permitted before pairing with the information processing apparatus 101 is completed. On the other hand, for a characteristic whose "pairing need" field is blank, the information processing apparatus 101 can read/write a value even in a state in which pairing with the communication apparatus 151 is not performed. "Value" represents a value set in each characteristic.

Outline of Pairing

In this embodiment, authentication is performed between the information processing apparatus 101 and the communication apparatus 151, and pairing processing for permitting transmission/reception of specific data by GATT communication between the apparatuses is executed. Here, in a state in which pairing with the information processing apparatus 101 is not executed, the communication apparatus 151 does not permit information transmission/reception by GATT communication. This can prevent an apparatus that is not paired with the communication apparatus 151 from receiving information from the communication apparatus 151 and prevent information held by the communication apparatus 151 from being accidentally obtained by such an apparatus. Note that as described above, as described above, there can exist GATT communication that is permitted in a state in which pairing is not performed and GATT communication that is not permitted in a state in which pairing is not performed. For example, convenience of communication can be improved by enabling communication of information of low confidentiality by GATT communication that is permitted in a state in which pairing is not performed. On the other hand, security can be improved by enabling communication of information of high confidentiality only by GATT communication that is not permitted in a state in which pairing is not performed. Note that information of high confidentiality can include, for example, the state information or setting information of the communication apparatus 151 but may include information other than these.

Figures 11A, 11B:
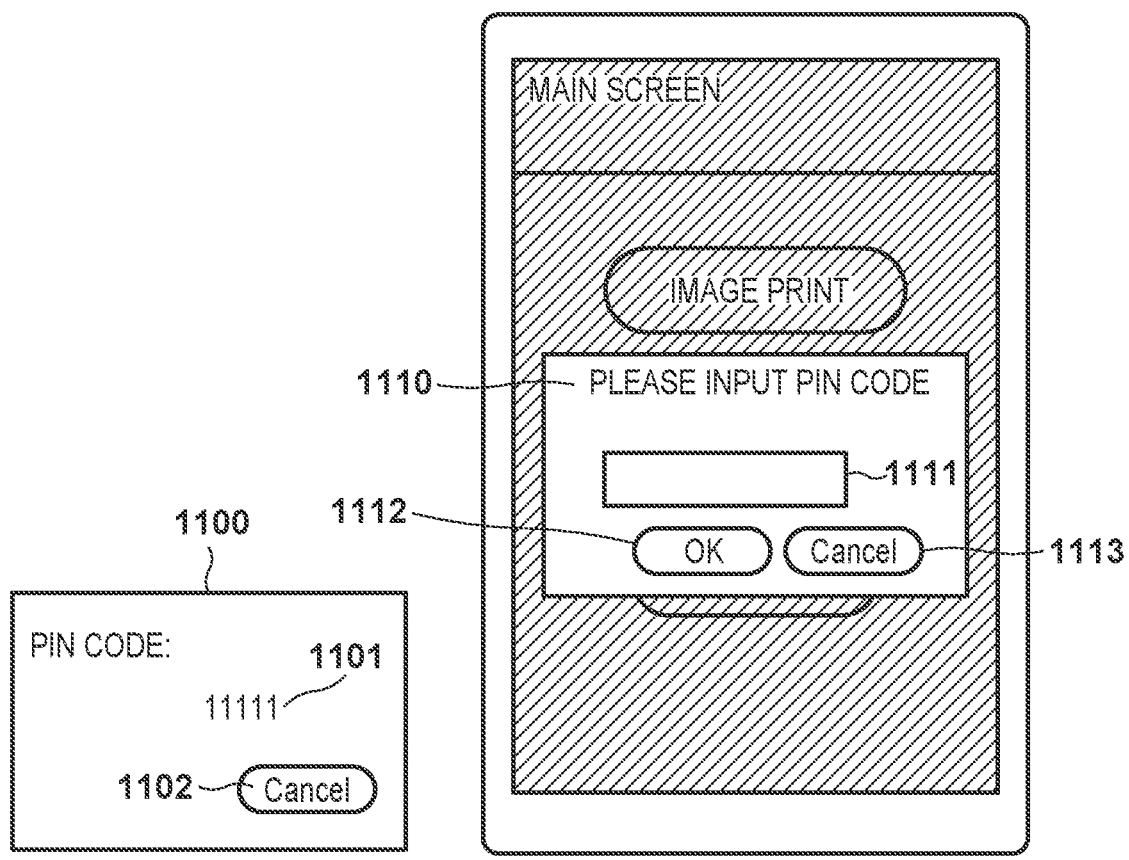
FIGS. 11A and 11B are views showing examples of screens concerning pairing processing.

Details of pairing processing will be described. If the above-described print application is activated, and a pairing processing execution instruction is accepted from the user via the print application, the information processing apparatus 101 starts searching for advertisement information including specific device information. Note that the specific device information is, for example, the UUID or MAC address of an apparatus (printer or the like) corresponding to the print application. Upon receiving advertisement information including specific device information, the information processing apparatus 101 displays, on the display unit, a list of the apparatuses of the transmission sources of the advertisement information including the specific device information, and accepts selection of a pairing target apparatus from the user. Here, the communication apparatus 151 is selected. If the selection of the apparatus of the pairing target is accepted, the information processing apparatus 101 transmits a pairing request to the communication apparatus 151 by communication using a security manager protocol (SMP). Note that the communication between the apparatuses is performed by the SMP until the pairing ends. If the pairing method is numeric comparison, upon receiving the pairing request, the communication apparatus 151 displays a PIN code display screen 1100 as shown in FIG. 11A on the operation panel. For example, a PIN code 1101 and a cancel button 1102 used to cancel pairing processing are displayed on the PIN code display screen 1100. On the other hand, when transmitting the pairing request, the information processing apparatus 101 displays a PIN code input screen 1110 as shown in FIG. 11B on the display unit 108. For example, a PIN code input region 1111 used to accept input of a PIN code by the user is displayed on the PIN code input region 1110. Also, an OK button 1112 used to transmit the input PIN code to the communication apparatus 151, and a cancel button 1113 used to cancel pairing processing are displayed. If the OK button 1112 is pressed in a state in which the PIN code is input to the PIN code input region 1111, the information processing apparatus 101 transmits information including the input PIN code to the communication apparatus 151. The communication apparatus 151 determines whether the PIN code included in the received information matches the PIN code 1101 displayed on the PIN code display screen 1100 and, upon determining that the PIN codes match, permits pairing with the information processing apparatus 101. For example, the communication apparatus 151 exchanges link keys created based on the PIN code 1101 by a predetermined method with the information processing apparatus 101 using the SMP of the BLE standard. The exchanged link keys are stored in the storage area (ROM 104 or the like) in the information processing apparatus 101 and the storage area (ROM 152 or the like) in the communication apparatus 151. Pairing is thus completed, and BLE communication between the apparatuses is permitted from then on. Note that when pairing is completed, the communication apparatus 151 makes the PIN code display screen 1100 undisplayed, and displays the original screen again.

When transmitting a GATT communication request to the communication apparatus 151 after completion of pairing, the information processing apparatus 101 notifies the communication apparatus 151 of the link key stored in the storage area at the time of pairing processing. Upon receiving the GATT communication request, the communication apparatus 151 compares the link key stored in the storage area at the time of pairing processing with the notified link key, and confirms whether the apparatus of the transmission source of the GATT communication request is a paired apparatus. Upon confirming that the apparatus is a paired apparatus, the communication apparatus 151 starts information transmission/reception by GATT communication with the apparatus (information processing apparatus 101). Hence, after the pairing processing with the communication apparatus 151 is completed once, the information processing apparatus 101 can execute GATT communication with the communication apparatus 151 without input of the PIN code by the user.

Note that an example in which the user is caused to input the PIN code 1101 displayed on the PIN code input screen 1110 to the PIN code input region 1111 has been described here. However, the present disclosure is not limited to this form. For example, the PIN code can be permanent information for which an arbitrary change by the user is not permitted, and the PIN code can be stored in the information processing apparatus 101 simultaneously with installation of the print application. The information processing apparatus 101 may notify the communication apparatus 151 of the stored PIN code without displaying the PIN code input region 1110 or accepting input by the user. In addition, the timing of starting pairing processing is not limited to the above-described example. For example, pairing processing can be started at a timing at which the user has instructed printing via the print application or a timing before BLE connection is performed in connection setting processing.

The PIN code input screen 1110 the information processing apparatus 101 displays may not be displayed depending on the print application. For example, the information processing apparatus 101 may have an application for setting (to be referred to as a "setting application" hereinafter). The setting application is, for example, an application program configured to do settings concerning functions to be executed by the OS. The setting application can be, for example, installed together with the OS in a series of processes of installing the OS in the information processing apparatus 101 or installed in advance together with the OS at the time of delivery of the information processing apparatus 101. For example, if a pairing instruction is input by the print application, the information processing apparatus 101 activates the setting application to make the print application do state transition to operate in the background. Then, the information processing apparatus 101 may accept, from the user, input for pairing to the Bluetooth® setting screen displayed by the setting application.

A PIN code input type pairing method has been described here. However, pairing may be executed by another method. For example, the information processing apparatus 101 obtains information called a key seed, which is held by the communication apparatus 151, from the communication apparatus 151 via BLE connection. The information processing apparatus 101 and the communication apparatus 151 generate link keys from the key seed in accordance with a rule recognized by them in advance. The generated link keys are stored in the storage area (ROM 104 or the like) of the information processing apparatus 101 and the storage area (ROM 152 or the like) of the communication apparatus 151. The information processing apparatus 101 and the communication apparatus 151 thus hold identical link keys. In this way, each of the information processing apparatus 101 and the communication apparatus 151 can generate a link key and execute GATT communication using the link key. Accordingly, authentication between the communication apparatus 151 and the information processing apparatus 101 is performed, and pairing processing is completed. After completion of pairing processing, information encrypted based on the link key is communicated by communication between the information processing apparatus 101 and the communication apparatus 151. Upon receiving information encrypted based on the link key, each of the information processing apparatus 101 and the communication apparatus 151 cancels encryption using the link key held by the self-apparatus, thereby obtaining the information before encryption.

Procedure of BLE Communication

The procedure of BLE communication executed between the information processing apparatus 101 and the communication apparatus 151 will be described with reference to FIG. 12. Processing of the communication apparatus 151 in this processing sequence is implemented when the CPU 154 loads a control program stored in a storage device such as the ROM 152 or an HDD (not shown) provided in the communication apparatus 151 into the RAM 153 and executes the control program. Additionally, processing of the information processing apparatus 101 in this processing sequence is implemented when the CPU 103 loads a control program stored in a storage device such as the ROM 104 or an HDD (not shown) provided in the information processing apparatus 101 into the RAM 105 and executes the control program.

Note that here, as described above, the communication apparatus 151 is assumed to be an advertiser that transmits advertisement information at a predetermined interval, and the information processing apparatus 101 is assumed to be a scanner that waits for advertisement information transmitted from an advertiser on the periphery. First, the short-range wireless communication unit 157 in the communication apparatus 151 transmits advertisement information (steps S1201 to S1203). The information processing apparatus 101 can recognize the existence of the communication apparatus 151 when the short-range wireless communication unit 110 receives the advertisement information transmitted from the short-range wireless communication unit 157.

When recognizing the communication apparatus 151 and deciding to connect the communication apparatus 151, the information processing apparatus 101 transmits connection request information to the communication apparatus 151. For example, the short-range wireless communication unit 110 transmits CONNECT_REQ that is a request to transition to a connection event for establishing network connection by BLE to the short-range wireless communication unit 157 of the communication apparatus 151 (step S1204). When the short-range wireless communication unit 157 receives CONNECT_REQ, the communication apparatus 151 notifies, for example, the CPU 154 that connection processing for GATT communication is completed, and transitions to the connection event. In addition, in accordance with the transmission of CONNECT_REQ, the short-range wireless communication unit 110 notifies the CPU 154 that connection processing for GATT communication is completed, and transitions to the connection event. Then, the information processing apparatus 101 and the communication apparatus 151 transition from the scanner and the advertiser to a master and a slave, respectively, and the information processing apparatus 101 that is the master and the communication apparatus 151 that is the slave establish BLE connection for GATT communication. Note that in the BLE standard, a master can form a "one-to-multiple" star topology with slaves. That is, the information processing apparatus 101 can be connected to the communication apparatus 151 and can also parallelly be connected to another apparatus operating as a slave. After BLE connection is established, the information processing apparatus 101 and the communication apparatus 151 can perform data communication by the GATT communication method.

Note that before accessing GATT data of the communication apparatus 151 by GATT communication, the information processing apparatus 101 needs to obtain the structure of GATT data held by the communication apparatus 151. As the structure of GATT data of the communication apparatus 151, the information processing apparatus 101 obtains, for example, information representing the number of services in GATT data, the number of characteristics, the values of UUIDs, an attribute representing a read enable/disable state, and the like. The procedure of the information processing apparatus 101 to obtain the structure of GATT data is called "discovery". After BLE connection is established in step S1204, the information processing apparatus 101 starts discovery. The information processing apparatus 101 transmits, to the communication apparatus 151, a discovery request to request information representing the structure of the GATT data of the communication apparatus 151, and receives information representing the structure of the GATT data from the communication apparatus 151 as a response to the discovery request (step S1205). Upon receiving the information representing the structure of the GATT data, the information processing apparatus 101 specifies an area where a hash value is stored in the GATT data of the communication apparatus 151, and reads the hash value. In the example shown in FIG. 10, the hash value is stored in a database hash characteristic whose characteristic UUID is "0x2B2A". The communication apparatus 151 stores, as the value of the database hash characteristic, a hash value calculated in advance from the structure of the GATT data. That is, the hash value is a value uniquely determined in accordance with the structure of the GATT data of the communication apparatus 151.

Note that the information processing apparatus 101 stores a hash value read from a partner apparatus to which the information processing apparatus 101 has been connected by BLE in the past in the memory such as the ROM 104. The information processing apparatus 101 determines whether a value that matches the hash value read in step S1205 is included in the hash values read in the past and stored in the memory (step S1206). That is, the information processing apparatus 101 determines whether it has been connected to the communication apparatus 151 by BLE in the past. At this time, the information processing apparatus 101 may perform this determination based on not only the hash value but also another information such as individual identification information such as the MAC address of the communication apparatus 151.

If the hash value read in step S1205 does not match any value stored in the memory, the information processing apparatus 101 continues discovery to grasp the rest of the structure of the GATT data of the communication apparatus 151. The information processing apparatus 101 transmits, to the communication apparatus 151, a discovery request to request information representing the structure of the GATT data of the communication apparatus 151 (step S1207). Upon receiving the request, the communication apparatus 151 transmits the information representing the structure of the GATT data to the information processing apparatus 101 (step S1208). Note that transmission/reception of the discovery request and transmission/reception of the information representing the structure of the GATT data are repeated as many times as the number of services, characteristics, and descriptors in the GATT data. Hence, the information processing apparatus 101 repetitively transmits the discovery request until all pieces of information representing the structure of the GATT data are received (step S1209), and receives the information representing the structure of the GATT data as a response. Upon receiving all pieces of information representing the structure of the GATT data, the information processing apparatus 101 stores the structure of the GATT data of the communication apparatus 151 as a cache in the memory of the self-apparatus (step S1210). At this time, the information processing apparatus 101 stores the cache of the structure of the GATT data of the communication apparatus 151 and the hash value obtained from the communication apparatus 151 in the memory in association with each other. Note that the information processing apparatus 101 may further store another information such as individual identification information such as the MAC address of the communication apparatus 151 in the memory in association. Note that even in a case in which the hash value read in step S1205 matches a value stored in the memory, the information processing apparatus 101 may execute processes as in step S1207 to S1210. In this case, these processes may be omitted.

After obtaining the structure of the GATT data of the communication apparatus 151, the information processing apparatus 101 executes arbitrary GATT communication with the communication apparatus 151 (step S1211). After the GATT communication is completed, the information processing apparatus 101 transmits a release request to the communication apparatus 151 to disconnect the BLE connection (step S1212). Upon receiving the release request, the communication apparatus 151 transmits a release response (step S1213). The BLE connection between the information processing apparatus 101 and the communication apparatus 151 is thus disconnected. When the BLE connection between the information processing apparatus 101 and the communication apparatus 151 is disconnected, the information processing apparatus 101 and the communication apparatus 151 return to the scanner and the advertiser, respectively, and the communication apparatus 151 resumes transmission of advertisement information.

Information Presentation Processing

Figure 13:
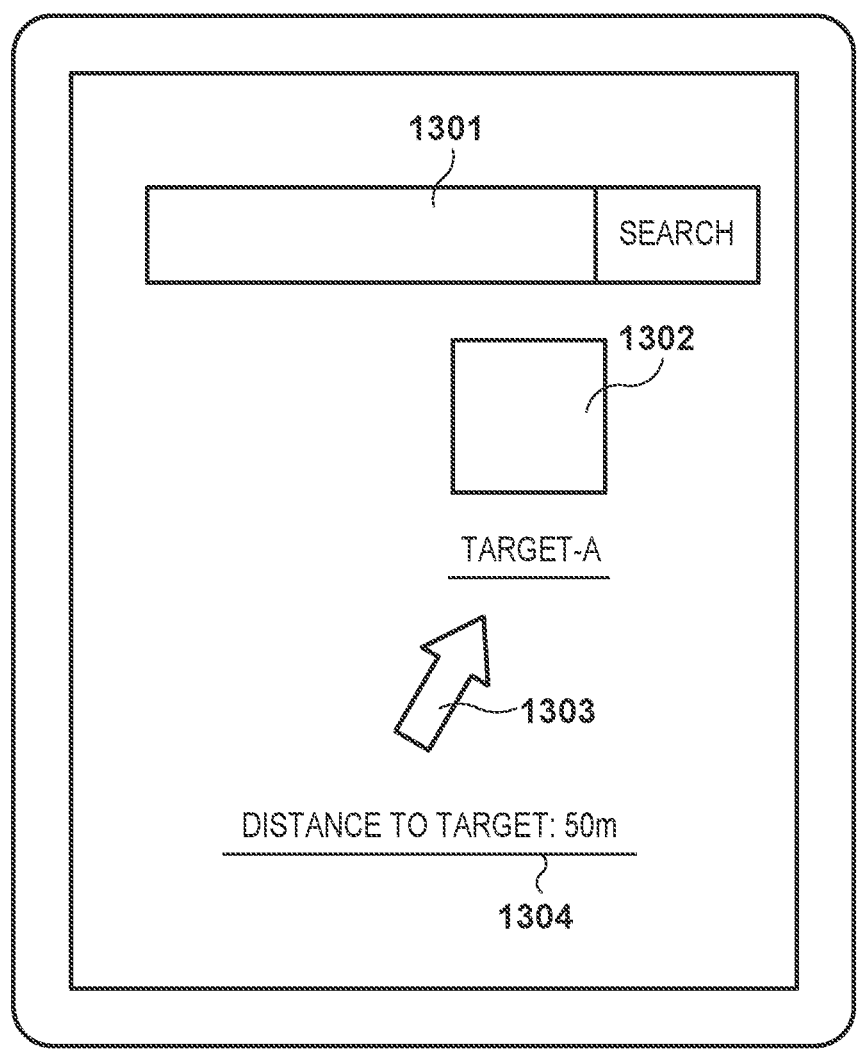
FIG. 13 is a view showing an example of a screen that displays the position information of a target.

The information processing apparatus 101 according to this embodiment executes information presentation processing of, for example, causing the display unit 108 to display the relative position of a target that is a target of information presentation viewed from the self-apparatus. In an example, if the communication apparatus 151 is a printer, and the target is a consumable such as exchangeable ink or toner for the printer, the information presentation processing is used to make the user specify the position where the consumable to be exchanged is placed near the communication apparatus 151. FIG. 13 shows an example of a screen displayed by the information processing apparatus 101. The user of the information processing apparatus 101 first inputs, to a target search box 1301, information by which it is possible to identify the target whose position should be specified. The information processing apparatus 101 then obtains identification information concerning the target and information concerning the position (direction and distance) by processing to be described later, and based on the information, displays the information concerning the position of the target on the screen. On this screen, an object 1302 representing the target, and a direction 1303 and a distance 1304 in which the target exists are displayed.

At this time, to display a screen as shown in FIG. 13 for a target such as an apparatus that does not include a short-range wireless communication unit or various kinds of consumables, the information processing apparatus 101 obtains information concerning the relative position from the communication apparatus 151 to the target. The information processing apparatus 101 specifies the position of the target viewed from the self-apparatus based on the position of the communication apparatus 151 viewed from the self-apparatus and the position of the target viewed from the communication apparatus 151. To do this, the communication apparatus 151 holds (stores) the relative position of the target viewed from the self-apparatus in the ROM 152 or the like together with information by which it is possible to identify the target. Note that the relative position of the target can be represented by, for example, coordinates of a planar position, height, and the like.

The information processing apparatus 101 holds the relative position up to the target and the information by which it is possible to identify the target, which are obtained from the communication apparatus 151, as a relative position information database (DB). FIG. 14 shows an example of the relative position information DB concerning a target. The relative position information DB includes, for example, various kinds of parameters such as a relative position ID 1401, a communication apparatus ID 1402, a target name 1403, relative position information X 1404, relative position information Y 1405, and relative position information Z 1406. In the relative position ID 1401, a value assigned to discriminate information concerning each of one or more targets is stored. In the communication apparatus ID 1402, information for identifying the communication apparatus 151 that is the obtaining source of the relative position information of the target is stored. In the target name 1403, information by which it is possible to identify the target, such as a name and a model, is stored. As the relative position information X 1404, the relative position information Y 1405, and the relative position information Z 1406, the coordinates of three-dimensional relative positions from the communication apparatus 151 to the target are stored. The coordinates are represented by, for example, east, west, north, and south and a height. The relative position information X 1404 represents, for example, a position in the east-west direction. When the value X is set to +10, a position apart by 10 m in the east direction can be expressed. When the value X is set to −5, a position apart by 5 m in the west direction can be expressed. Similarly, the relative position information Y 1405 represents, for example, a position in the south-north direction. When the value Y is set to +5, a position apart by 5 m in the north direction can be expressed. When the value Y is set to −5, a position apart by 5 m in the south direction can be expressed. The relative position information Z 1406 represents, for example, a position in the height direction. When the value Z is set to +20, a position 20 cm higher can be expressed. When the value Z is set to −50, a position 50 cm lower can be expressed. Note that the expression method is not limited to this, and the unit and direction may be different from these. For example, a position apart by (x1/10) m in the south direction may be expressed by setting the value X to +x1, and a position apart by (x2/10) m in the north direction may be expressed by setting the value X to −x2. Alternatively, polar coordinates may be used. Note that an operation using another DB may be performed for each parameter type, or parameter types other than the above-described example may be registered in the relative position information DB.

An example of the procedure of processing of presenting, by the information processing apparatus 101 information as shown in FIG. 13 using such information will be described next.

Figure 15:
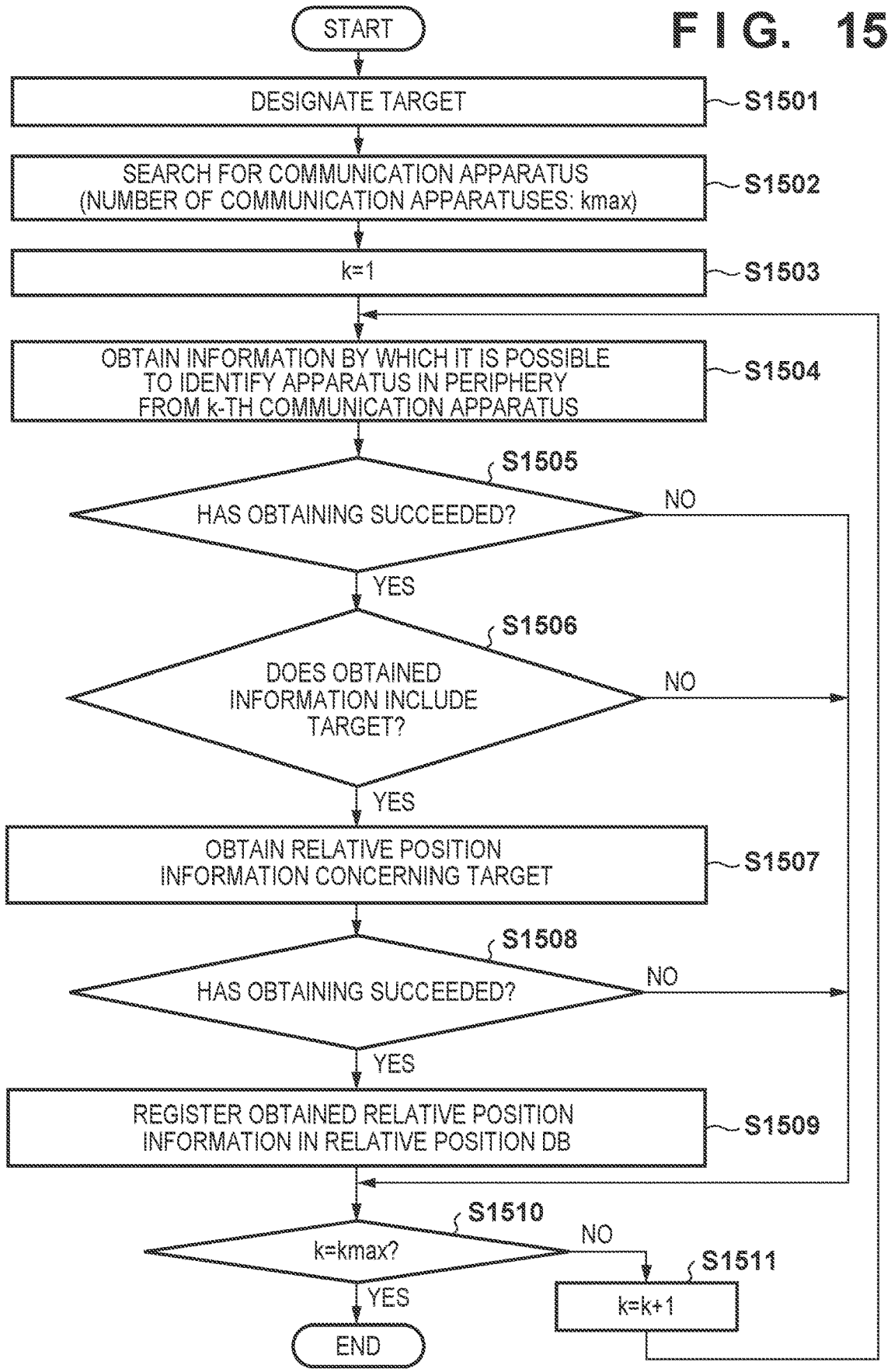
FIG. 15 is a flowchart showing an example of the procedure of processing of obtaining the relative position information of a target.

FIG. 15 shows an example of the procedure of processing of obtaining identification information or relative position information concerning a target by the information processing apparatus 101. Processing shown in FIG. 15 is implemented when, for example, the CPU 103 of the information processing apparatus 101 loads an application stored in the ROM 104 or the like into the RAM 105 and executes the application. Alternatively, processing shown in FIG. 15 may be executed at the timing of displaying the screen shown in FIG. 13, or may be executed in the background independently of the screen display. Note that the procedure of processing shown in FIG. 15 is merely an example. For example, the order of processing steps may be changed, some processing steps may be omitted, or a processing step that is not shown may be added.

In this processing, the information processing apparatus 101 first accepts a designation of a target by the user (step S1501). For example, when the user inputs a target to the search box 1301 and presses the "search" button, the designation of the target is accepted. Note that, for example, an external file for designating a target may be prepared in advance, or information for designating a target may be set in advance in a predetermined area of a memory. Alternatively, an identifier by which it is possible to designate a target, such as a QR code® or a barcode, may be read using a camera (not shown) provided in the information processing apparatus 101, thereby designating the target. The information processing apparatus 101 searches for the communication apparatus 151 that exists on the periphery of the self-apparatus (step S1502). Here, assume that the number of found communication apparatuses 151 is kmax. The information processing apparatus 101 performs the processes of steps S1504 to S1509 for each of the found communication apparatuses 151. Note that here, the information processing apparatus 101 sequentially performs the processes for the kmax communication apparatuses 151, and initialization processing for that is executed (step S1503). Note that for the descriptive convenience, FIG. 15 shows an example in which the processes are sequentially performed. However, the processes of steps S1504 to S1509 may be executed in parallel for the plurality of communication apparatuses 151.

In step S1504, the information processing apparatus 101 obtains, from the communication apparatus 151 of the processing target, information by which it is possible to identify an apparatus existing on the periphery of the communication apparatus 151 (step S1504). For an apparatus existing on the periphery of the self-apparatus, the communication apparatus 151 manages the information of the relative position based on the position of the self-apparatus. The information processing apparatus 101 obtains the information by which it is possible to identify the apparatus, which is managed by the communication apparatus 151 of the processing target. If obtaining of the information by which it is possible to identify the apparatus, which is managed by the communication apparatus 151 of the processing target, has failed (NO in step S1505), the information processing apparatus 101 does not execute the processes of steps S1506 to S1509 for the communication apparatus 151 of the processing target. On the other hand, if obtaining of the information by which it is possible to identify the apparatus, which is managed by the communication apparatus 151 of the processing target, has succeeded (YES in step S1505), the information processing apparatus 101 then determines whether the target designated in step S1501 is included in the obtained information (step S1506). Upon determining that the target designated in step S1501 is not included in the obtained information (NO in step S1506), the information processing apparatus 101 does not execute the processes of steps S1507 to S1509 for the communication apparatus 151 of the processing target. Upon determining that the target designated in step S1501 is included in the obtained information (YES in step S1506), the information processing apparatus 101 obtains relative position information concerning the designated target from the communication apparatus 151 (step S1507). Note that if obtaining of the relative position information concerning the designated target has failed (NO in step S1508), the information processing apparatus 101 does not execute the process of step S1509. On the other hand, if obtaining of the relative position information concerning the designated target has succeeded (YES in step S1508), the information processing apparatus 101 registers the obtained information in the relative position information DB as shown in FIG. 14 (step S1509).

After that, the information processing apparatus 101 determine whether all the communication apparatuses 151 found in step S1502 have undergone the above-described processing (step S1510). If the communication apparatus 151 that has not undergone the processing exist (NO in step S1510), the information processing apparatus 101 sets the next communication apparatus 151 to the processing target (step S1511), and repeats the processes of steps S1504 to S1509. On the other hand, if the communication apparatus 151 that has not undergone the processing does not exist (YES in step S1510), the information processing apparatus 101 ends the processing shown in FIG. 15.

Note that the information processing apparatus 101 may obtain, for example, all pieces of relative position information concerning the apparatuses managed by the found communication apparatus 151. That is, the process of step S1506 may be omitted. In this case, the information processing apparatus 101 can generate a relative position information DB based on the relative position information of the apparatuses managed by the communication apparatus 151 on the periphery by the processing shown in FIG. 15, and after that, accept the designation of the target as the target of information presentation. The information processing apparatus 101 may search for the relative position information DB for the information of the designated target and obtain the information. Additionally, for example, in the search of step S1502, the information processing apparatus 101 may specify the position (direction and distance) of the communication apparatus 151, and register the specified information in the relative position information DB concerning the target.

In addition, the information processing apparatus 101 may end the processing shown in FIG. 15 when, for example, the information concerning the designated target is normally registered in the relative position information DB in step S1509. That is, since the information processing apparatus 101 need only present the position of the designated target, additional information collection and registration processing may be inhibited after the information concerning the target is registered. Instead of executing the processing for all found communication apparatuses 151, the information processing apparatus 101 may collect/register only information obtained from, for example, the communication apparatus 151 whose distance from the self-apparatus is minimum or the communication apparatus 151 whose distance from the self-apparatus falls within a predetermined range. This can prevent an increase in the size of the relative position information DB.

Figure 16:
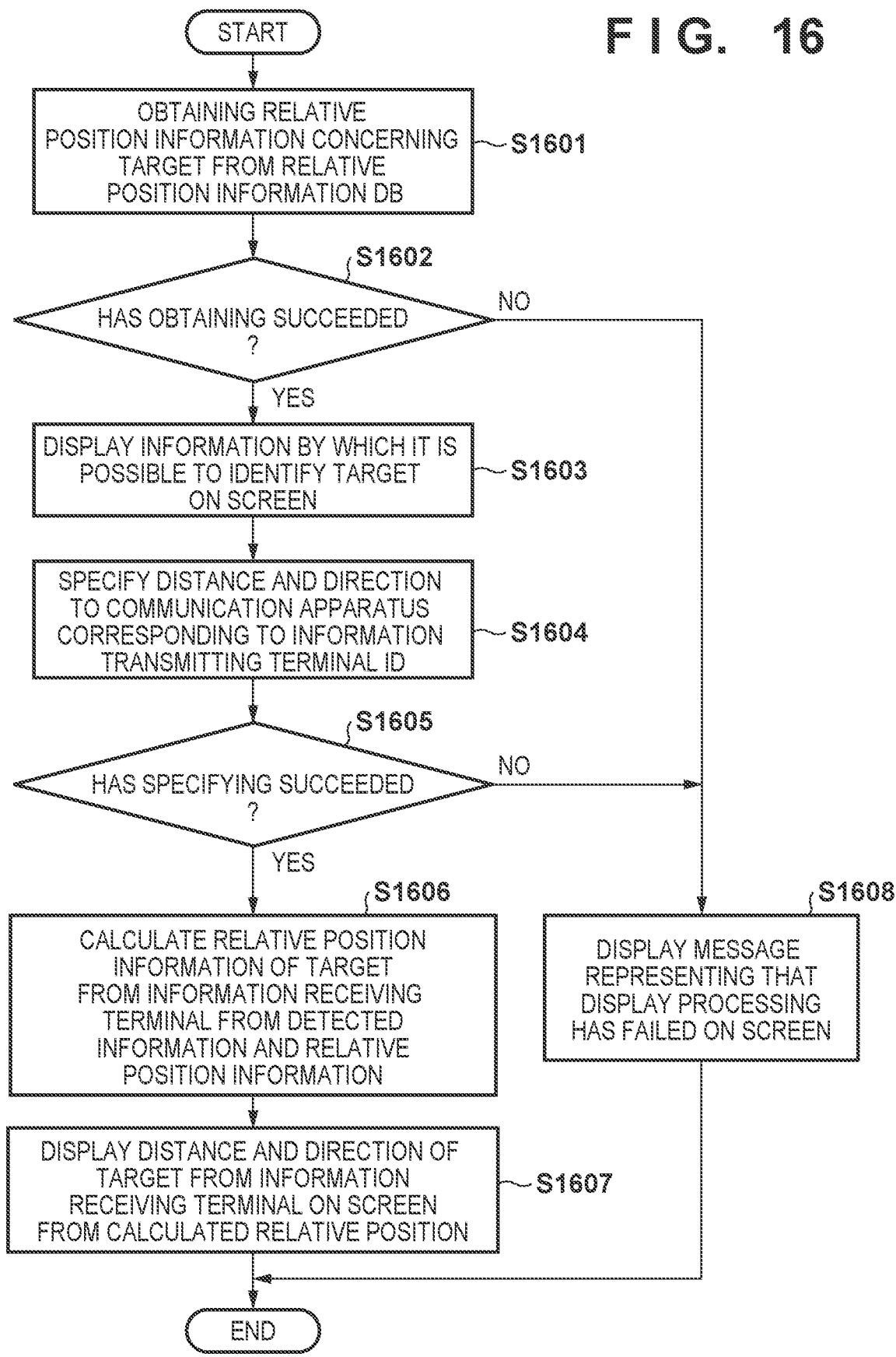
FIG. 16 is a flowchart showing an example of the procedure of processing of displaying the position information of a target.

The procedure of processing of displaying relative position information concerning a target, as shown in FIG. 13, by the information processing apparatus 101 will be described next with reference to FIG. 16. Processing shown in FIG. 16 is implemented when, for example, the CPU 103 of the information processing apparatus 101 loads an application stored in the ROM 104 or the like into the RAM 105 and executes the application. Note that the procedure of processing shown in FIG. 16 is executed, for example, at the timing of displaying the screen shown in FIG. 13. Note that the procedure of processing shown in FIG. 16 is merely an example. For example, the order of processing steps may be changed, some processing steps may be omitted, or a processing step that is not shown may be added.

First, the information processing apparatus 101 obtains relative position information concerning the target from the relative position information DB (step S1601). If obtaining of the relative position information has failed (NO in step S1602), the information processing apparatus 101 displays a message representing that the display processing has failed on the screen (step S1608), and ends the processing. For example, if information concerning the target is not included in the relative position information DB, the information processing apparatus 101 can determine that obtaining of the relative position information has failed. On the other hand, if obtaining of the relative position information has succeeded (YES in step S1602), the information processing apparatus 101 displays the name of the target on the screen (step S1603). The name of the target displayed here is a character string (for example, "merchandise name A") stored as the target name 1403 in the relative position information DB. Next, the information processing apparatus 101 specifies the communication apparatus 151 specified by the communication apparatus ID 1402 in the relative position information DB, and specifies the position (direction and distance) of the communication apparatus 151 viewed from the self-apparatus (step S1604). Specifying of the position of the communication apparatus 151 is executed in accordance with the procedure as described above with reference to FIGS. 5 to 8. The position of the communication apparatus 151 may be specified in step S1502 of FIG. 15. Note that after the position of the communication apparatus 151 is specified, the information processing apparatus 101 can hold and reuse the position information. However, for example, if the information processing apparatus 101 has moved by a predetermined distance, or a predetermined time has elapsed, the information can be discarded. If the position of the communication apparatus 151 is discarded, the information processing apparatus 101 reobtains the position of the communication apparatus 151. The position of the communication apparatus 151 viewed from the information processing apparatus 101 can thus be estimated accurately.

If specifying of the position of the communication apparatus 151 has failed (NO in step S1605), the information processing apparatus 101 displays a message representing that the display processing has failed on the screen (step S1608), and ends the processing. On the other hand, if specifying of the position of the communication apparatus 151 has succeeded (YES in step S1605), the information processing apparatus 101 calculates the relative position information of the target viewed from the information processing apparatus 101 (step S1606). For example, the information processing apparatus 101 expresses the specified position of the communication apparatus 151 by coordinates, and adds the relative position information X 1404, the relative position information Y 1405, and the relative position information Z 1406 of the target obtained in step S1601 to the coordinates, thereby calculating the relative position of the target. Using the calculated relative position, the information processing apparatus 101 displays, on the screen, information representing the direction and distance in which the target exists when viewed from the information processing apparatus 101 (step S1607). Note that the information processing apparatus 101 can specify, for example, the direction in which the self-apparatus faces using a predetermined sensor and change the display based on the direction. For example, the information processing apparatus 101 specifies, based on the posture of the self-apparatus, the direction in which the user faces, and if the target exists behind the user, can perform display control to direct an arrow indicating the direction of the target downward. Alternatively, assuming that the target exists near the communication apparatus 151, the information processing apparatus 101 may display the information of the position corresponding to the communication apparatus 151 on the screen. According to this, it is possible to roughly present the position of the target to the user in a stage before the end of the calculation of step S1606. Note that if the information processing apparatus 101 includes a plurality of antennas, the relative direction of the communication apparatus 151 corresponding to the posture of the self-apparatus can be specified as shown in FIG. 7. It is therefore possible to control the direction of the arrow by the relative direction. As described above, the information processing apparatus 101 can control screen display representing the position of the target based on the direction of the target (the communication apparatus 151 in some cases) and the posture of the self-apparatus. Note that the processes of steps S1604 to S1607 may repetitively be executed by pressing an update button (not shown) on the screen or by periodical processing in the background. This can update the direction 1303 of the target and the distance 1304 to the target in FIG. 13 in real time and improve convenience. In this case, for example, if the distance and direction of the communication apparatus 151 cannot be specified in step S1605, the information processing apparatus 101 can repetitively execute the processing from step S1604 again instead of displaying the message representing that the display processing has failed. Note that considering that the direction frequently changes depending on how the user holds the information processing apparatus 101, but the distance does not immediately change, the specifying frequency of each of the distance and direction may individually be adjusted. For example, settings may be done such that for the direction, the screen display is updated at a high frequency, and for the distance, the screen display is updated at a frequency lower than the direction updating frequency.

In addition, for example, if the distance and direction of the communication apparatus 151 cannot be specified in step S1605, the information processing apparatus 101 may display alternative information by which it is possible to show the position of the target, such as floor information or map information, on the screen, or may execute the processing shown in FIG. 15 or FIG. 16 anew.

In addition, if the plurality of communication apparatuses 151 holds the information of the target, the information processing apparatus 101 can obtain a plurality of pieces of relative position information in step S1601. In this case, the processes of steps S1604 to S1606 may repetitively be executed based on the plurality of pieces of relative position information, and the information of the position of the target may be displayed based on the calculated relative positions. For example, a value such as the average value or the median of the calculated relative positions, or a relative position calculated from relative position information corresponding to the communication apparatus 151 closest to the information processing apparatus 101 can be employed as the relative position to be displayed. Alternatively, a value such as the average value or the median of relative positions calculated from relative position information corresponding to one or more communication apparatuses 151 existing within a predetermined range from the information processing apparatus 101 may be employed as the relative position to be displayed. This can improve the accuracy of the direction and distance displayed on the screen.

According to the above-described embodiment, it is possible to display the screen showing the position of a target such as an apparatus that does not include a short-range wireless communication unit or various kinds of consumables, as shown in FIG. 13. In a case in which the housing size of the communication apparatus 151 is large, but the number of mounted short-range wireless communication units 157 is small, this method can be used to show a position where a panel, a door, an ink tank, a paper feed exists in the structure of the communication apparatus 151. Additionally, in a case in which a plurality of targets exist as in trouble shooting or operation guidance, the processing operations shown in FIGS. 15 and 16 can be executed for the plurality of targets in a predetermined order or in the descending order of the distance from the information processing apparatus 101. This can sequentially display information concerning the plurality of targets in the predetermined order or in the descending order of the distance.

Information Registration Processing

Note that if the relative position of a target viewed from the communication apparatus 151 can easily be registered in the communication apparatus 151 together with information by which it is possible to identify the target, the screen as shown in FIG. 13 can be displayed for a newly purchased/installed target. FIG. 17 shows an example of a screen used to register the relative position information of a target in the communication apparatus 151 using a processing apparatus. Here, the processing apparatus may be the information processing apparatus 101, or may be an arbitrary apparatus having a function of specifying the relative positional relationship with the communication apparatus 151 and a function of communicating by a BLE communication function or the like, like the information processing apparatus 101. Note that if the processing apparatus is the information processing apparatus 101, information registered in the communication apparatus 151 here may be registered in the relative position information DB. In this case, since the information processing apparatus 101 can recognize the relative position between the target and the communication apparatus 151, processing as shown in FIG. 15 need not be executed for the target. On the other hand, when the information of the relative position of the target is registered in the communication apparatus 151 by processing to be described here, another information processing apparatus can obtain the information of the relative position by processing as shown in FIG. 15.

The processing apparatus activates, by, for example, a user operation, an application for registration in a place where the target is installed, and opens a screen shown in FIG. 17. The screen shown in FIG. 17 includes an input box 1701 that accepts input of a target name that is information by which it is possible to identify a target. The screen shown in FIG. 17 also includes a search result list 1702 in which the communication apparatuses 151 detected by the processing apparatus are displayed in a list. In the search result list 1702, the identification information of the communication apparatus 151 such as a communication apparatus ID, and information such as the distance (the direction in some cases) to the communication apparatus 151 when viewed from the processing apparatus are displayed in a list. The user of the processing apparatus selects at least one of the communication apparatuses 151 displayed in the search result list 1702 (adds a check mark to a check box), or presses a register button 1703, thereby registering the information of the target in the selected communication apparatus 151. For example, the processing apparatus transmits the information by which it is possible to identify the target and information representing the position of the communication apparatus 151 viewed from the self-apparatus to the communication apparatus 151. The communication apparatus 151 specifies the position of the target viewed from the communication apparatus 151 (that is, the position of the processing apparatus viewed from the communication apparatus 151) based on the information representing the position, and stores the position information and the information by which it is possible to identify the target in association with each other.

Figure 18:
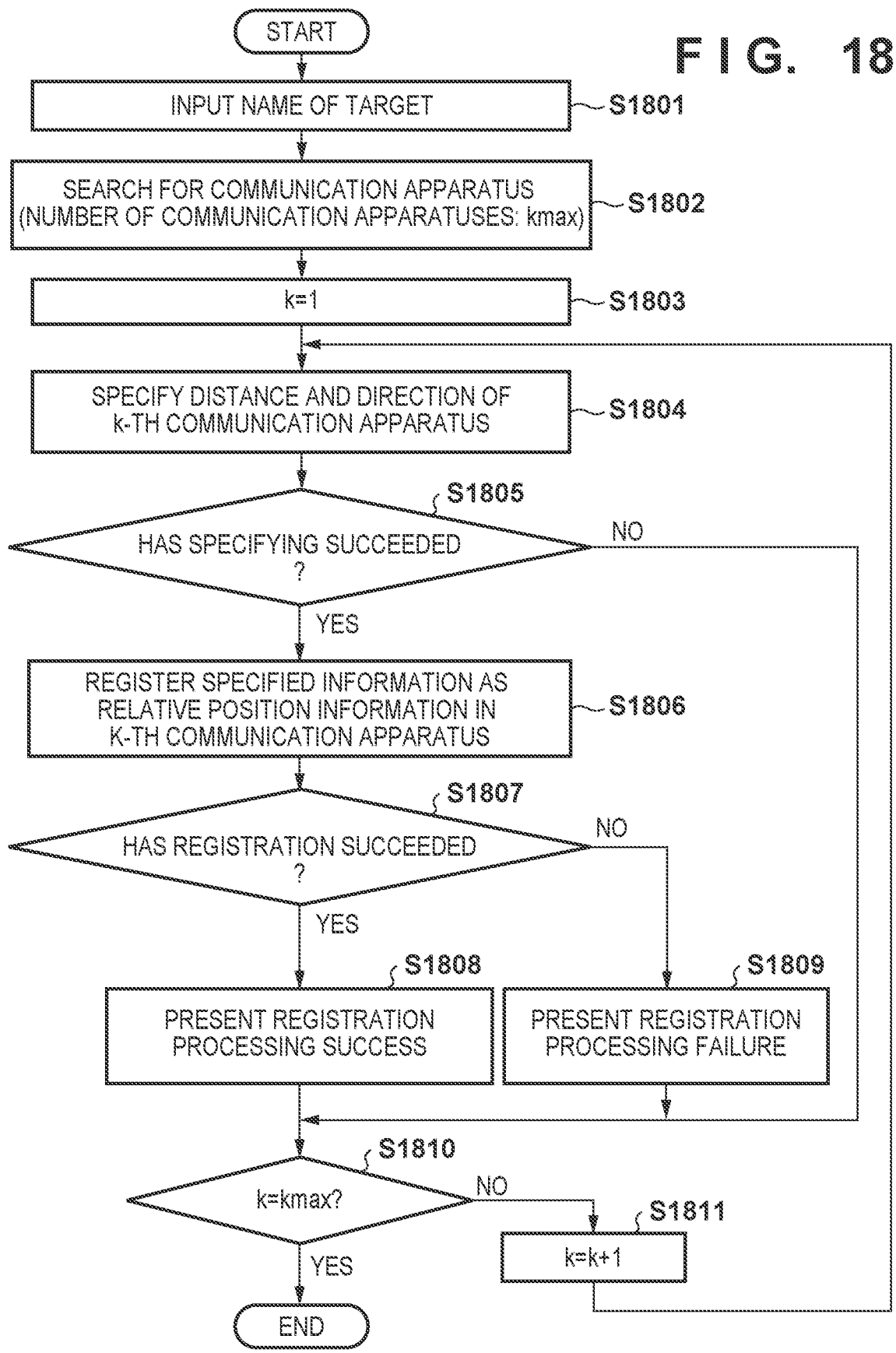
FIG. 18 is a flowchart showing an example of the procedure of registration processing of the relative position information of a target.

FIG. 18 shows an example of the procedure of processing of registering relative position information concerning a target in the communication apparatus 151 by the processing apparatus. Processing shown in FIG. 18 is implemented when, for example, the CPU of the processing apparatus loads an application stored in the ROM or the like into the RAM and executes the application. The registration processing shown in FIG. 18 may be executed, for example, at the timing of displaying the screen shown in FIG. 17 or at any other arbitrary timing.

In this processing, the processing apparatus first accepts user input of a target name (step S1801). The designation of the target here is performed by, for example, accepting user input to the input box 1701. Note that, for example, an external file for designating a target may be prepared in advance, or information for designating a target may be set in advance in a predetermined area of a memory. Alternatively, an identifier by which it is possible to designate a target, such as a QR code or a barcode, may be read using a camera or the like provided in the processing apparatus, thereby designating the target. Next, the processing apparatus searches for the communication apparatus 151 that exists on the periphery (step S1802). Here, assume that the number of found communication apparatuses 151 is kmax. The processing apparatus performs the processes of steps S1804 to S1809 for each of the found communication apparatuses 151. Note that the processing apparatus sequentially performs the processes for the kmax communication apparatuses 151, and initialization processing for that is executed (step S1803). Note that for the descriptive convenience, FIG. 18 shows an example in which the processes are sequentially performed. However, the processes of steps S1804 to S1809 may be executed in parallel for the plurality of communication apparatuses 151.

In step S1804, the processing apparatus specifies the distance and direction to the communication apparatus 151 of the processing target viewed from the self-apparatus (step S1804). If specifying of the distance and direction to the communication apparatus 151 viewed from the self-apparatus has failed (NO in step S1805), the processing apparatus does not execute the processes of steps S1806 to S1809 for the communication apparatus 151 of the processing target. If specifying of the distance and direction to the communication apparatus 151 viewed from the self-apparatus has succeeded (YES in step S1805), the processing apparatus transmits the specified information as relative position information to the communication apparatus 151 and causes the communication apparatus 151 to register it (step S1806). The processing apparatus determines whether the registration has succeeded (step S1807). For example, the processing apparatus can determine that registration has succeeded if transmission of the relative position information to the communication apparatus 151 (for example, write to a predetermined characteristic) is completed. If the transmission cannot be completed, the processing apparatus can determine that registration has failed. Alternatively, the processing apparatus can determine that registration has succeeded if, for example, a response signal representing success of reception is received from the communication apparatus 151 after the transmission of the relative position information to the communication apparatus 151. If such a response signal is not received, the processing apparatus can determine that registration has failed. If the registration processing of step S1806 has succeeded (YES in step S1807), the processing apparatus displays a message representing that the registration processing has succeeded on, for example, the display unit of the self-apparatus (step S1808). On the other hand, if the registration processing of step S1806 has failed (NO in step S1807), the processing apparatus displays a message representing that the registration processing has failed on, for example, the display unit of the self-apparatus (step S1809). After that, the processing apparatus determine whether all the communication apparatuses 151 found in step S1802 have undergone the above-described processing (step S1810). If the communication apparatus 151 that has not undergone the processing exists (NO in step S1810), the processing apparatus sets the next communication apparatus 151 to the processing target (step S1811), and repeats the processes of steps S1804 to S1809.

Note that the processing apparatus may end the processing shown in FIG. 18 when the registration processing of step S1806 has succeeded. In addition, the processing apparatus may display the search result list 1702 in which the communication apparatuses 151 found in step S1802 are listed and execute processing from step S1804 only for the communication apparatus 151 selected by the user via the search result list 1702. At this time, to present the distance from the processing apparatus to each communication apparatus 151 in the search result list 1702, the process of step S1804 may be executed in parallel to, for example, the process of step S1802. That is, the processing apparatus may execute the search of the communication apparatus 151 and the specifying of the distance and direction in parallel. In this case, the processing apparatus may select, for example, only the communication apparatus 151 having a distance from the self-apparatus that falls within a predetermined range, and execute the process of step S1806. In addition, the processing apparatus may display only the communication apparatuses 151 selected based on the distance from the self-apparatus in the search result list 1702, and accept user selection. The processing apparatus may execute the process of step S1806 only for the communication apparatus 151 whose distance from the self-apparatus is shortest. As described above, the information of the target may be registered only for limited communication apparatuses 151, thereby preventing the relative position information held by the communication apparatuses 151 from unnecessarily becoming redundant.

In the above-described way, the target can easily be registered in the communication apparatus 151 using the processing apparatus based on the measurement of the relative position to the communication apparatus 151.

First Modification of Screen Display

Figure 19:
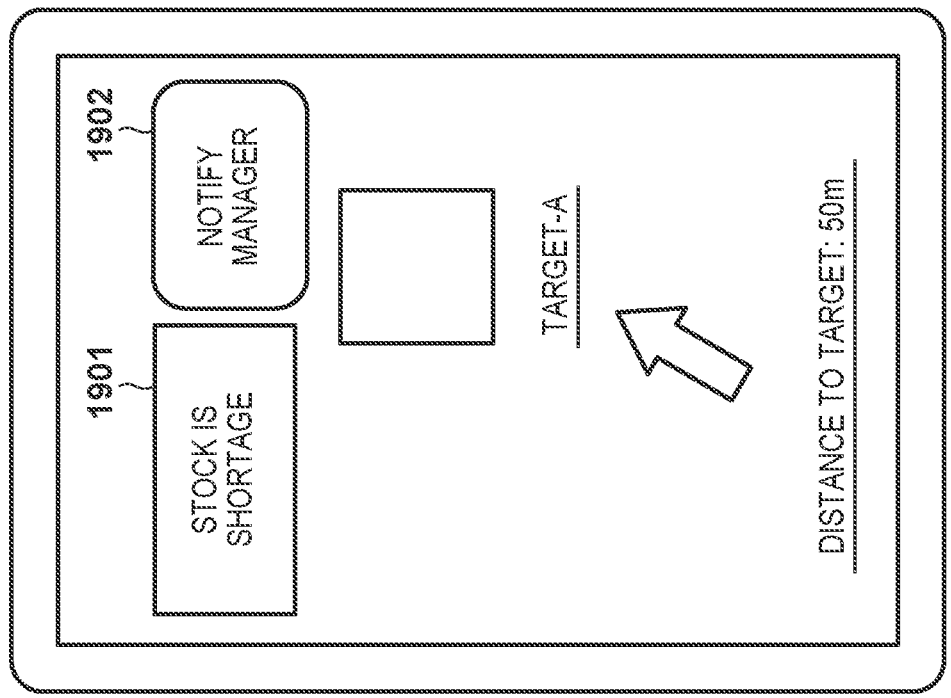
FIG. 19 is a view showing an example of a display screen of warning information concerning a target.

The target can be, for example, a consumable or merchandise to be displayed. Here, for example, if the target is a consumable, the stock may be insufficient. Alternatively, the target may be out of order. In this case, even if the user views a screen as shown in FIG. 13 and moves to the position of the target, the user may be unable to obtain or use the target, that is, it may be impossible or at least improbable to achieve the user's objective. For this reason, before the user moves to the position of the target, warning information concerning the fault/stock shortage of the target can be presented to the user on the screen of the information processing apparatus 101 in cooperation with an external management system that manages the state or stock of the target. FIG. 19 shows an example of a screen that displays warning information concerning a target. When displaying the screen for displaying the relative position information from the self-apparatus to a target, the information processing apparatus 101 communicates with an external management system as described above, and obtains management information such as fault information or stock information associated with the target. Note that the communication with the external management system may be performed at a timing other than this timing. For example, for at least some of targets registered in the relative position information DB, the information processing apparatus 101 may periodically communicate with the external management system that manages the targets, obtain management information, and update the information. If fault information or stock information exists for a target, the information processing apparatus 101 can display warning information in a warning message display portion 1901. If contact destination information (a telephone number, a mail address, account information of a contact application, or the like) to the manager of a target can be obtained from the external management system, the information processing apparatus 101 can also display a notification button 1902 to make a notification to the manager. When the notification button 1902 is pressed by the user, the information processing apparatus 101 can communicate with the obtained contact destination to the manager. Note that the manager may automatically be notified of the contents of the warning message display portion 1901.

This can perform appropriate screen display based on the state of the target. It is also possible to easily execute communication, for example, make contact to the manager to cope with the state.

Second Modification of Screen Display

Figure 20:
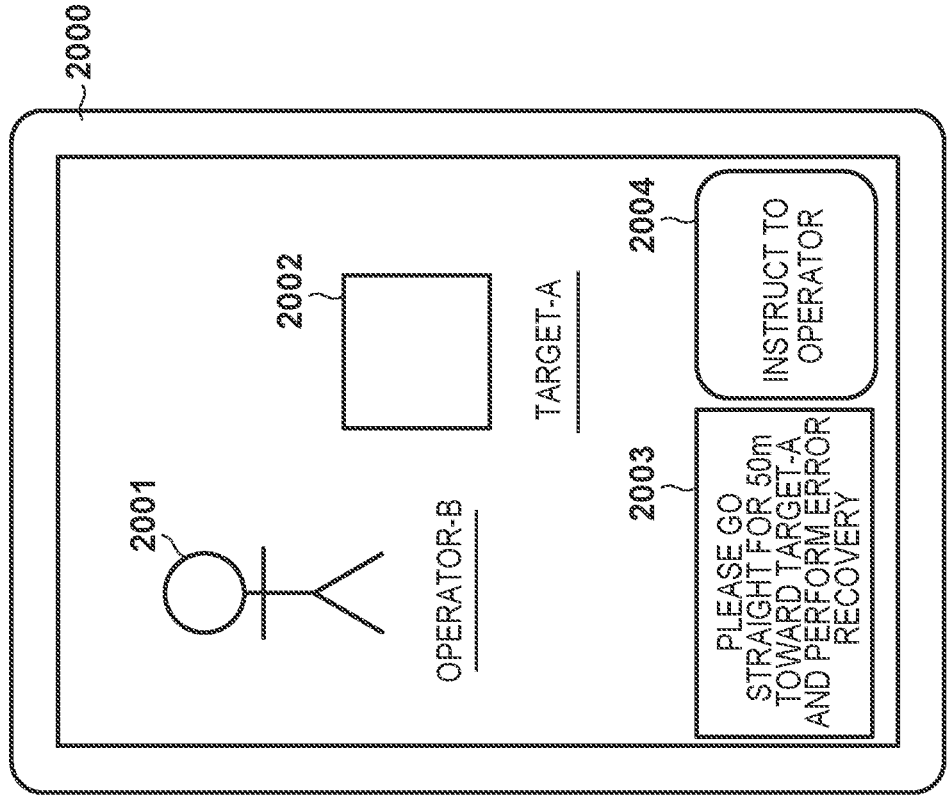
FIG. 20 is a view showing an example of a screen that transmits an instruction to an operator near a target.

When a manager at a position apart from a target gives a predetermined instruction to an operator near the target using the information processing apparatus 101 held by himself/herself, a screen as shown in FIG. 13 can be used. For example, if the operator holds an information terminal including the short-range wireless communication unit 157, the information processing apparatus 101 of the manager can display a screen configured to transmit an instruction to the operator near the target, as shown in FIG. 20. For example, the information processing apparatus 101 of the manager specifies the distance and direction to the information terminal of the operator, and displays an object 2001 representing the operator based on the specifying result. In addition, the information processing apparatus 101 specifies the distance and direction to the target, and displays an object 2002 representing the target based on the specified information. The positional relationship between the object 2001 representing the operator and the object 2002 representing the target is thus expressed on the screen. Note that for each object, the direction and distance of each of the devices (the information terminal of the operator and the target) viewed from the information processing apparatus 101 may be displayed, as displayed in FIG. 13. For example, if the object 2001 representing the operator is selected by the user, the information processing apparatus 101 displays, on the screen, an input box 2003 that inputs an operation instruction associated with the target to the operator, and a button 2004 used to transmit the instruction to the operator. The information processing apparatus 101 can accept instruction input from the manager to the operator via the input box 2003. The information processing apparatus 101 accepts the operation instruction by, for example, direct input or accepting selection from a plurality of templates prepared in advance. If the button 2004 is pressed in a state in which the operation instruction is accepted, the information processing apparatus 101 transmits the instruction contents accepted via the input box 2003 to the information terminal of the operator. Note that the information processing apparatus 101 may be configured such that it always display the input box 2003 on the screen, and if the button 2004 is pressed, transmit the instruction contents accepted via the input box 2003 to the information terminals of all operators displayed on the screen shown in FIG. 20. As described above, the screen display method according to this embodiment is usable in various scenes, and can increase the efficiency of various operations.

Note that in the above-described embodiment, an example in which the positional relationship between the information processing apparatus 101 and the communication apparatus 151 is specified using the BLE function has been described. However, the present disclosure is not limited to this. For example, the information processing apparatus 101 may execute positioning by a GPS (Global Positioning System) or the like, obtain the position information of the communication apparatus 151, which is represented by the positioning result by the GPS or the like, and specify the positional relationship based on the positioning result of the self-apparatus and the position information of the communication apparatus 151. In addition, instead of obtaining the positional relationship between a target and the communication apparatus 151 from the communication apparatus 151, the information processing apparatus 101 may obtain the positional relationship by BLE communication or the like in, for example, processing at the time of registration of the information of the target by the processing shown in FIG. 18.

The present disclosure is not limited to the above embodiments and various changes and modifications can be made within the spirit and scope of the present disclosure. Therefore, to apprise the public of the scope of the present disclosure, the following claims are made.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-224026, filed Dec. 11, 2019 which is hereby incorporated by reference herein in its entirety.

What is claimed is:

1. An information processing apparatus comprising:
at least one processor and at least one memory coupled to each other to perform operations including:
specifying a first position, wherein a communication apparatus holds a target and the first position is a position of the communication apparatus as viewed from the information processing apparatus by wireless communication with the communication apparatus,
obtaining information representing a second position, wherein the second position is a position of the target as viewed from the communication apparatus by wireless communication with the communication apparatus, and
displaying information representing a third position, wherein the third position is a position of the target as viewed from the information processing apparatus based on the specified first position and the second position represented by the obtained information.

2. The information processing apparatus according to claim 1, wherein specifying includes specifying a direction of the communication apparatus based on a phase difference between a plurality of signals that the information processing apparatus receives from the communication apparatus in the wireless communication, and specifying the first position based on the direction of the communication apparatus.

3. The information processing apparatus according to claim 2, wherein specifying includes specifying the direction of the communication apparatus based on a phase difference between plural signals received from the communication apparatus between a plurality of antennas provided in the information processing apparatus.

4. The information processing apparatus according to claim 2, wherein specifying unit includes specifying the direction of the communication apparatus based on a phase difference when the information processing apparatus receives signals transmitted by a plurality of antennas provided in the communication apparatus.

5. The information processing apparatus according to claim 2, wherein specifying unit includes specifying a distance between the communication apparatus and the information processing apparatus based on the wireless communication, and specifying the first position based on the distance and the direction of the communication apparatus.

6. The information processing apparatus according to claim 1, wherein the wireless communication is communication performed in compliance with the Bluetooth Low Energy standard.

7. The information processing apparatus according to claim 1, wherein displaying includes displaying pieces of information representing third positions concerning a plurality of targets sequentially in a predetermined order.

8. The information processing apparatus according to claim 1, wherein displaying includes displaying pieces of information representing third positions concerning a plurality of targets sequentially in an order based on a distance between each target and the information processing apparatus.

9. The information processing apparatus according to claim 1, wherein the operations further include registering the information representing the second position in the communication apparatus.

10. The information processing apparatus according to claim 1,
wherein the operations further include obtaining information associated with the target from an external system, and
wherein displaying includes displaying a screen including the information representing the third position and the obtained information associated with the target from the external system.

11. The information processing apparatus according to claim 1,
wherein the operations further include transmitting an instruction of an operation associated with the target to another information processing apparatus, and
wherein displaying includes displaying a screen including information for accepting a user operation concerning the instruction of the operation associated with the target and the information representing the third position.

12. The information processing apparatus according to claim 11, wherein displaying includes displaying the screen including information representing the other information processing apparatus and the information representing the third position.

13. The information processing apparatus according to claim 1, wherein the communication apparatus is a printer, and the target is a consumable concerning the printer.

14. A method for an information processing apparatus, the method comprising:
- specifying a first position, wherein a communication apparatus holds a target and the first position is a position of the communication apparatus as viewed from the information processing apparatus by wireless communication with the communication apparatus;
- obtaining information representing a second position, wherein the second position is a position of the target as viewed from the communication apparatus by wireless communication with the communication apparatus; and
- displaying information representing a third position, wherein the third position is a position of the target as viewed from the information processing apparatus based on the specified first position and the second position represented by the obtained information.

15. A non-transitory computer-readable storage medium storing a program to cause a computer to perform a method for an information processing apparatus, the method comprising:
- specifying a first position, wherein a communication apparatus holds a target and the first position is a position of the communication apparatus as viewed from the information processing apparatus by wireless communication with the communication apparatus;
- obtaining information representing a second position, wherein the second position is a position of the target as viewed from the communication apparatus by wireless communication with the communication apparatus; and
- displaying information representing a third position, wherein the third position is a position of the target as viewed from the information processing apparatus based on the specified first position and the second position represented by the obtained information.

* * * * *